United States Patent
Fuest et al.

(10) Patent No.: US 12,540,044 B2
(45) Date of Patent: Feb. 3, 2026

(54) CELLULAR WHEEL SLUICE FOR BULK MATERIAL, AND METHOD FOR AUTOMATICALLY CLEARING A CELLULAR WHEEL OF SUCH A CELLULAR WHEEL SLUICE

(71) Applicant: Coperion GmbH, Stuttgart (DE)

(72) Inventors: Cornel Fuest, Ravensburg (DE); Max Langenberger, Kleintissen (DE); Matthias Schorer, Amtzell (DE); Jochen Sprung, Ravensburg (DE); Michael Walter, Bad Saulgau (DE); Bruno Zinser, Waldburg (DE)

(73) Assignee: COPERION GMBH, Stuttgart (DE)

( * ) Notice: Subject to any disclaimer, the term of this patent is extended or adjusted under 35 U.S.C. 154(b) by 0 days.

(21) Appl. No.: 18/851,491

(22) PCT Filed: Mar. 20, 2023

(86) PCT No.: PCT/EP2023/057043
§ 371 (c)(1),
(2) Date: Sep. 27, 2024

(87) PCT Pub. No.: WO2023/186597
PCT Pub. Date: Oct. 5, 2023

(65) Prior Publication Data
US 2025/0108983 A1    Apr. 3, 2025

(30) Foreign Application Priority Data
Mar. 30, 2022  (DE) .................... 10 2022 203 136.9

(51) Int. Cl.
*B65G 53/46*    (2006.01)
(52) U.S. Cl.
CPC ...... *B65G 53/4633* (2013.01); *B65G 2201/04* (2013.01)

(58) Field of Classification Search
None
See application file for complete search history.

(56) References Cited

U.S. PATENT DOCUMENTS 5,002,084 A  *  3/1991  Wilson ............... B65G 53/4633
                                                          406/65
2017/0002955 A1    1/2017  Boscarino

FOREIGN PATENT DOCUMENTS

CN    202296206 U   7/2012
DE    4135395 A1    4/1993
(Continued)

OTHER PUBLICATIONS

International Search Report and Written Opinion for Appln. No. PCT/EP2023/057043, mailed Jun. 22, 2023, 19 pages.
(Continued)

*Primary Examiner* — William R Harp
(74) *Attorney, Agent, or Firm* — DINSMORE & SHOHL LLP

(57) ABSTRACT

A cellular wheel sluice for bulk material comprises a housing having an interior, an extraction side cover releasably fastened to the housing, a cellular wheel which is arranged in an operational position in the housing so that it can be driven in rotation about a longitudinal axis and which is held on the extraction side cover, an extraction device for displacing the cellular wheel between the operational position and an extracted position, wherein the extraction device has a guide unit for guided displacement of the cellular wheel along an extraction direction parallel to the longitudinal axis, and an extraction drive arranged fixed to the housing and coupled to the extraction side cover for automatically driven displacement of the extraction side cover with the cellular wheel.

14 Claims, 19 Drawing Sheets

(56) References Cited

FOREIGN PATENT DOCUMENTS

| | | |
|---|---|---|
| DE | 202005004889 U1 | 5/2005 |
| DE | 10242563 B4 | 6/2006 |
| DE | 20 2007 003 357 U1 | 3/2007 |
| EP | 0426334 A1 * | 5/1991 |

OTHER PUBLICATIONS

German Examination Report for Appln. No. 10 2022 203 136.9, dated Dec. 23, 2022, 7 pages.

* cited by examiner

CELLULAR WHEEL SLUICE FOR BULK MATERIAL, AND METHOD FOR AUTOMATICALLY CLEARING A CELLULAR WHEEL OF SUCH A CELLULAR WHEEL SLUICE

CROSS-REFERENCES TO RELATED APPLICATIONS

This application is a National Stage of International Application PCT/EP2023/057043 filed on Mar. 20, 2023, which claims the priority of the German patent application DE 10 2022 203 136.9 filed on Mar. 30, 2022, the content of both of which are incorporated herein by reference in their entirety.

FIELD OF THE INVENTION

The invention relates to a cellular wheel sluice and a method for automatically clearing a cellular wheel of such a cellular wheel sluice.

BACKGROUND OF THE INVENTION

A cellular wheel sluice with a cellular wheel that can be moved between an operational position and a maintenance position is known from DE 102 42 563 B4. The displacement of the cellular wheel between the operational position and the maintenance position is time-consuming and complex. The accessibility of the cellular wheel sluice, in particular the cellular wheel and/or the housing, is difficult.

SUMMARY OF THE INVENTION

The object of the invention is to simplify the accessibility of a cellular wheel sluice, in particular to product-containing components and/or areas of the cellular wheel sluice, and in particular to make it fail-safe, in order in particular to simplify cleaning and/or maintenance of the cellular wheel sluice.

According to the invention, this object is achieved by embodiments of a cellular wheel sluice as described herein and by methods as described herein.

The essence of the invention is that a cellular wheel of a cellular wheel sluice can be driven and guided between an operational position and an extracted position by means of an extraction device. The extraction device has a guide unit so that the cellular wheel can be displaced in a guided manner along an extraction direction. In particular, the extraction direction is oriented parallel to a longitudinal axis of the cellular wheel. The extraction device also has an extraction drive to enable driven displacement. The extraction drive is in particular a mechanical drive and in particular a motorized drive. The manual effort required to move the cellular wheel between the operational position and the extracted position is reduced and, in particular, avoided. The extraction drive enables automatic displacement of the cellular wheel sluice. In particular, the cellular wheel sluice enables automatic displacement and/or extraction of the cellular wheel from the housing.

The cellular wheel sluice according to the invention creates the prerequisites for a partially or fully automatic displacement of the cellular wheel into the extracted position for cleaning and/or maintenance processes. In particular, hygiene requirements for the cleaning process can be realized, especially cleaning under clean room conditions, in particular without human interaction. Health risks during the cleaning of cellular wheel sluices due to harmful, in particular toxic, substances, for example in the field of pharmaceutical product manufacture and/or battery manufacture, are reduced.

The extraction drive is fixed to the housing. The extraction drive, in particular its drive housing, is in particular fixedly connected to the housing of the cellular wheel sluice. In particular, the drive housing is arranged immovably in relation to the housing of the cellular wheel sluice. The extraction drive has at least one movable element that is arranged so that it can be displaced relative to the housing for the driven displacement of the cellular wheel. The moving masses are reduced. Such a process saves energy and is therefore economically and ecologically advantageous.

An extraction side cover is releasably attached to the housing. The cellular wheel is held on the extraction side cover. The extraction drive is mechanically coupled to the extraction side cover. A displacement of the extraction side cover by means of the extraction drive immediately causes a displacement of the cellular wheel. In particular, the extraction side cover and the cellular wheel are moved together.

In the operational position, the cellular wheel is arranged in the housing so that it can be driven in rotation about the longitudinal axis. In the operational position, the housing of the cellular wheel sluice is closed and, in particular, locked by the at least one extraction side cover. In the extracted position, the cellular wheel is extracted from the housing, in particular completely extracted. In the extracted position, the housing can be opened, in particular by releasing the at least one side cover from the housing, in particular by unlocking it and in particular by removing it. In the extracted position, the cellular wheel is cleared and accessible, in particular for maintenance and/or cleaning activities. In the extracted position, the cellular wheel can be freely rotated about the longitudinal axis.

Both the cellular wheel, which is held in the extracted position in particular on the extraction side cover, and the housing, in particular its interior, are particularly advantageously accessible for maintenance and cleaning work in the extracted position.

The cellular wheel sluice is used for conveying bulk material along a material conveying direction, in particular in a metered manner. The material conveying direction through the cellular wheel sluice is oriented in particular from an inlet to an outlet. The inlet opens into the interior of the housing. The outlet leads out from the interior.

The cellular wheel enables simplified and, in particular, error-proof handling. The cellular wheel sluice is easy to operate. In particular, the cellular wheel sluice can be operated by personnel with little or no previous knowledge.

In particular, the guide unit guarantees forced guidance when the cellular wheel is displaced. Forced guidance means that the displacement is predetermined in a displacement direction, i.e., can only take place along this predetermined displacement direction. In particular, guide elements of the guide unit absorb forces that are oriented transversely and in particular perpendicular to the displacement direction, in particular vertically, so that the displacement can take place particularly smoothly along the displacement direction. The displacement direction is oriented horizontally in particular. The risk of injury to an operator and/or damage to the cellular wheel sluice, in particular as a result of improper operation, is reduced.

The extraction drive makes it easier to extract the cellular wheel, which can have a large mass, especially with large sizes. The force required to move the cellular wheel between the operational position and the extracted position is reduced by the use of the guide unit. The at least partially automatic cellular wheel sluice, especially in large sizes, complies with occupational health and safety regulations. The extraction drive is also particularly advantageous if the cellular wheel is stuck in and/or on the housing, in particular if it is stuck as a result of a sticky product.

A cellular wheel sluice according to embodiments improves the accessibility, in particular of the housing. A side cover pivot axis is oriented in particular transversely, in particular vertically, and in particular at a distance from the longitudinal axis. The extraction side cover can be pivoted together with the cellular wheel from the extracted position into a pivoted extracted position. The pivoted extracted position is also referred to as the pivot position. A pivot angle about the side cover pivot axis is in particular at least 45°, in particular at least 60°, in particular at least 90°, in particular at least 135°, in particular at least 180°, in particular at least 225°, in particular at least 270° and in particular less than 360°.

A side cover pivot drive is used to automatically pivot the extraction side cover and simplifies the pivoting of the cellular wheel. Particularly with large cellular wheel sluice sizes, the extraction side cover with the attached cellular wheel can weigh up to 50 kg or more. The side cover pivot drive reduces the manual effort required from an operator. The side cover pivot drive is designed in particular as a pneumatic, hydraulic or electric rotary drive, which is arranged in particular coaxially to the side cover pivot axis.

Alternatively, the extraction side cover can be pivoted manually. In this case, the side cover pivot drive is not required. The amount of equipment required is reduced.

A cellular wheel sluice according to embodiments enables an uncomplicated and direct displacement of the cellular wheel from the operational position into the extracted position and further into the pivot position. In particular, the cellular wheel sluice is designed to be uncomplicated and inexpensive and, in particular, has only a single extraction drive which enables both the displacement of the cellular wheel from the housing and the pivoting of the cellular wheel about the side cover pivot axis. For this purpose, the extraction drive is coupled mechanically to the side cover pivot axis, in particular by means of a pivot lever that engages eccentrically with respect to the side cover pivot axis.

A guide unit according to embodiments enables a robust and stable mechanical guidance of the cellular wheel, in particular of the extraction side cover together with the cellular wheel attached thereto and in particular together with a cellular wheel drive. A linear guide comprises in particular at least one linear guide element, in particular at least two and in particular at least three linear guide elements. The at least one linear guide element is designed in particular as a guide rod, which is displaceably guided along a linear guide direction, in particular by means of a guide sleeve and/or by means of a linear ball bearing. The guide rods have in particular a round outer contour in a plane oriented perpendicular to the linear guide direction. Alternatively, the outer contour can be non-circular, in particular square and in particular rectangular. In this case, the guide rod is designed as a guide rail or guide plate. Alternatively, the linear guide element can comprise a guide rail along which a guide carriage is guided in a linearly displaceable manner.

Several linear guide elements are arranged in a guide plane in particular. In particular, the guide plane is oriented parallel or perpendicular to the material conveying direction. In particular, the guide plane is arranged at a distance from the longitudinal axis of the cellular wheel. The guide plane can also be oriented transversely, in particular with an angle of inclination between 30° and 60°, in particular with an angle of inclination of 45°, relative to the direction of material conveyance. In particular, the guide plane oriented with the angle of inclination can have the longitudinal axis.

In particular, if more than two linear guide elements are provided, these can also be arranged outside a common plane. For example, three linear guide elements can be arranged on one side of the housing. Two linear guide elements can be arranged in a common vertical plane and a third linear guide element, which is arranged in the vertical direction between the two other linear guide elements, is arranged outside the vertical guide plane, in particular at a greater distance from the housing of the cellular wheel sluice.

If, for example, four linear guide elements are provided, these can be arranged in a plane perpendicular to the linear axis at the corners of a rectangle, in particular a square, or a trapezoid.

The linear guide elements can be identical or different in terms of shape and size.

Alternatively, the guide unit can have a hinge-like design, in particular a hinge joint, and in particular can comprise at least two joint elements which are connected to one another and arranged so as to be pivotable relative to one another about a common pivot axis. Such a guide unit is known, for example, from DE 102 42 563 B4, to which explicit reference is made with regard to its mode of operation and design. In particular, the guide unit has two joint elements, each of which is articulated at a first end to the cellular wheel sluice and at a second end to each other. The guide unit has a particularly robust and stable design and is particularly suitable for large cellular wheel sluices and especially for cellular wheels with a large mass. The guide unit enables a precisely guided displacement of the cellular wheel along the extraction direction, which is linear. The guide unit is designed to save space, particularly along the extraction direction. The installation space required along the extraction direction by axially arranged guide rods or guide rails is dispensable. It is particularly advantageous if the extraction drive can be released from the extraction side cover in this design. A pivot and movement range for the extraction side cover and the cellular wheel attached to it is increased. Accessibility to the housing and/or cellular wheel is improved.

If the guide unit is hinged with two joint elements, it is advantageous if the cellular wheel is conical in relation to the longitudinal axis. Accordingly, the interior of the housing is also correspondingly conical.

An extraction drive according to embodiments enables a reliable and uncomplicated displacement of the cellular wheel. The design as a linear drive simplifies the mechanical coupling with the guide unit and in particular the displacement along the extraction direction. In particular, a piston-cylinder arrangement, especially a pneumatic cylinder or a hydraulic cylinder, serves as the linear drive. An electric spindle drive, which comprises a threaded spindle driven by an electric motor with a spindle nut arranged longitudinally displaceably thereon, can also serve as a linear drive.

A combination of the extraction drive and the guide unit as an integral component according to embodiments is particularly advantageous. The integral component is designed in particular as an electric linear axis or as a so-called linear unit. Such a component has a compact and small design.

At least one fastening element according to embodiments enables indirect fastening of the extraction side cover to the housing. The at least one fastening element is in particular a screw. It is advantageous if a locking state of the at least one fastening element can be detected automatically. This can be achieved, for example, by means of an inductive screw holder, in which the locking position of a screw, in particular a metric screw, is detected by means of a sensor element, in particular by means of an inductive sensor. As a result, a locking or unlocking state can be detected for the at least one fastening element, in particular automatically.

The at least one fastening element can alternatively be designed as a swing clamp. In particular, a swing clamp has a clamping element that can be moved, in particular driven, between a holding position and a release position. In the holding position, the extraction side cover is held on the housing, in particular locked. In the release position, the extraction side cover is released, in particular unlocked. The clamping element has, in particular, a longitudinal portion and a transverse portion attached to it, which is arranged, in particular, eccentrically with respect to a longitudinal direction of the longitudinal portion. To displace the clamping element between the holding position and the release position, in particular an axial displacement along the longitudinal direction of the longitudinal portion and a rotation about the longitudinal direction is provided, wherein the rotary movement takes place in particular in a rotary angle range between 0° and 180° and in particular between 0° and 90° and in particular the rotary movement is superimposed by a longitudinal movement.

In addition or as an alternative to the at least one fastening element, the extraction side cover according to embodiments can be designed with a twist lock. In particular, the twist lock is operated automatically and enables automatic locking of the extraction side cover. In this design, the extraction side cover is attached directly to the housing and, in particular, locked. Separate fastening elements are not required. The twist lock is designed, for example, as a bayonet lock or as a segment lock or as a clamping ring lock. In particular, the twist lock is a quick-release fastener that is used for pressurized containers, for example.

In particular, it is possible to automatically release the at least one fastening element and/or the twist lock, in particular to automatically remove the extraction side cover from the housing. In particular, fully automatic clearing of the cellular wheel is possible, in particular by automatic release of the extraction side cover and automatic removal of the cellular wheel with the extraction side cover.

At least one position detection sensor, in particular a limit switch, can be arranged on the extraction side cover and/or on the housing. This allows the relative position between the extraction side cover and the housing, in particular the closed position of the extraction side cover on the housing, to be reliably detected. This position detection is particularly advantageous for recommissioning after the cellular wheel has been re-introduced into the housing and simplifies the fully automatic operation of the cellular wheel sluice.

A cellular wheel sluice according to embodiments simplifies the attachment of the rotary drive to the cellular wheel.

A cellular wheel sluice according to embodiments enables a compact coupling of the cellular wheel drive to the housing. If the cellular wheel drive is held on a drive side cover arranged opposite the extraction side cover, the respective side covers can be designed in a functionally optimized manner. The extraction side cover is used to extract and, if necessary, pivot the cellular wheel. The drive side cover is used to hold the cellular wheel drive. A cellular wheel sluice of this type has a robust design.

Alternatively, it is possible to attach the cellular wheel drive to the extraction side cover to which the cellular wheel is also attached. In this case, the drive side cover, on which no cellular wheel drive is then arranged, can have a particularly uncomplicated design and, in particular, can be fixedly connected to the housing. With this design, additional and in particular complex extraction devices for the drive side cover are unnecessary. In particular, it is conceivable to dispense with the drive side cover altogether in this embodiment, i.e. to provide only a side cover on which the cellular wheel drive and the cellular wheel are held.

A cellular wheel sluice according to embodiments enables improved accessibility of the housing. In particular, a drive pivot axis is oriented parallel to the side cover pivot axis. In particular, a separate pivot drive is provided to enable a driven pivot movement of the drive side cover. The drive side cover can be pivoted in relation to the housing. The drive pivot axis can be fixed to the housing, i.e., arranged on the housing. If the drive side cover can be displaced relative to the housing by means of a second extraction device, the drive pivot axis is arranged in particular on the drive side cover or connected to it.

The second extraction device functions in particular analogously and in particular identically to the extraction device and enables an additional extraction movement for the drive side cover, in particular with the cellular wheel drive held on it.

The second extraction device can at least partially use components of the extraction device on the extraction side cover, in particular the guide unit and/or the extraction drive. This reduces the number of components required.

A cellular wheel sluice according to embodiments simplifies the return movement of the cellular wheel from the extracted position to the operational position. An outer envelope defined by the webs of the cellular wheel is designed in the shape of a truncated cone. The conical cellular wheel facilitates introduction into the housing. The introduction is particularly self-centering. A cone angle with respect to the longitudinal axis is in particular at most 15°, in particular at most 10°, in particular at most 8°, in particular at most 6°, in particular at most 5°, in particular at most 3° and in particular at most 1°.

A safety device according to embodiments reduces the risk of injury to an operator and/or the risk of damage to the cellular wheel sluice in the event of improper operation.

The safety device can comprise an actuating unit for the extraction drive, wherein the actuating unit is designed in such a way that it can only be operated by two-handed operation by an operator. This eliminates safety risks, particularly with regard to health, for the operator, especially when introducing the cellular wheel into the housing. Two-handed operation can be implemented in particular via a 5/3-way valve with a spring-centered middle position, especially if the extraction drive is designed as a pneumatic drive. In addition, a switching element can be provided that must be actuated, i.e. pressed, during the process. The switching element is a release element and is also referred to as an unlocking switch.

The safety device can alternatively or additionally comprise a force limiter in order to prevent injuries and/or damage as a result of unintentional and/or improper actuation of the extraction drive, in particular in the introduction direction. In particular, the extraction drive has a sensor element that detects the actuating force or the actuating energy, wherein further actuation of the extraction drive, in particular further extraction of the cellular wheel, is stopped when an upper threshold value is reached or exceeded. In this way, crushing and/or injuries can be avoided in particular.

In addition or alternatively, the safety device can define a spatial safety area, in particular by means of one or more light barriers, which immediately stop the operation of the extraction device and in particular of the extraction drive if the safety area is violated without authorization and/or unintentionally, in particular by triggering a light barrier.

The safety device can additionally or alternatively have a position detection sensor, in particular in the form of a limit switch, in order to detect in particular the closed arrangement of the housing.

A control unit according to embodiments simplifies the automatic and in particular the fully automatic operation of the cellular wheel sluice, in particular for opening the cellular wheel, for extracting the cellular wheel from the housing and/or for pivoting the extracted cellular wheel. For this purpose, the control unit is in signal connection in particular with the extraction drive, with the second extraction drive, with the pivot drives, with the at least one fastening element, with the rotary lock and/or with at least one position sensor, in particular a limit switch for detecting the position of the side cover.

A method according to embodiments in essence has the advantages of the cellular wheel sluice according to embodiments, to which reference is hereby made. The method enables the partially or fully automatic clearing of the cellular wheel. In particular, the method also enables the partially or fully automatic re-introduction of the cellular wheel into the housing of the cellular wheel sluice. In particular, optional pivoting of the extraction side cover and/or the drive side cover is possible. Cleaning and/or maintenance processes can be simplified and, in particular, made automatic. In particular, the extraction side cover and/or the drive side cover can be automatically or manually attached to the housing and, in particular, locked. Commissioning the cellular wheel sluice after a cleaning and/or maintenance process is simplified.

A method according to embodiments simplifies the introduction of the cellular wheel into the housing, i.e., the displacement of the cellular wheel into the operational position, in particular during initial commissioning, i.e., during assembly, or during use of the cellular wheel sluice, when the cellular wheel is displaced from the pivot position and/or from the extracted position back into the operational position.

It has been found that it is advantageous if the cellular wheel drive rotates about the longitudinal axis in a rotary angle range of at most 45° in order to simplify the mechanical coupling of the cellular wheel with the cellular wheel drive. In particular, the range of rotary angles is at most 40° and especially 20° to 30°. This rotation of the cellular wheel is also referred to as re-adjustment rotation and can, in particular, take place several times, in particular until a target rotary angle position of the cellular wheel is reached in which the cellular wheel can be mechanically coupled to the cellular wheel drive.

A cellular wheel sluice according to embodiments enables an advantageous displacement of the extraction side cover with the cellular wheel attached thereto by advantageously pushing the extraction side cover away from the housing. The extraction drive, in particular its drive housing, is arranged so that it can be displaced relative to the housing. The extraction drive, in particular its drive housing, is fixedly attached to the extraction side cover and connected to it. In particular, the drive housing is arranged immovably in relation to the extraction side cover. The extraction drive itself is designed in particular identically to the extraction drive according to embodiments.

The guide unit is advantageously designed as a linear guide in embodiments.

In particular, all advantageous embodiments described herein are also possible as advantageous embodiments of the cellular wheel sluice.

Both the features specified in the claims and the features specified in the following exemplary embodiments of the device according to the invention are each suitable, either on their own or in combination with one another, for further developing the subject matter according to the invention. The respective combinations of features do not represent any restriction with regard to the developments of the subject matter of the invention, but are, in essence, merely exemplary in character.

BRIEF DESCRIPTION OF THE DRAWINGS

Further features, advantages and details of the invention are presented in the following description of exemplary embodiments with reference to the drawing, in which.

DETAILED DESCRIPTION

Figure 1:
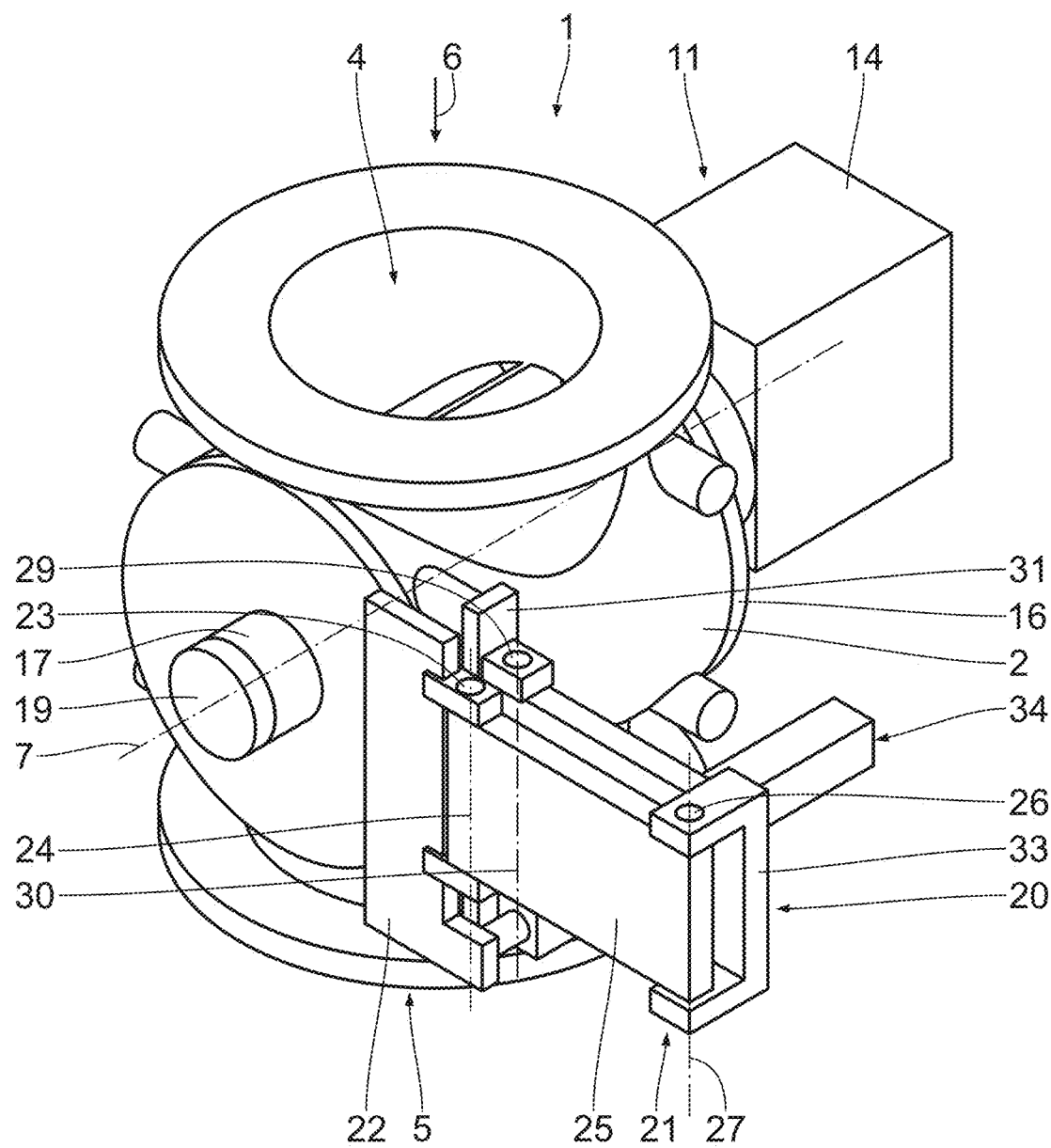
FIG. 1 shows a perspective view of a cellular wheel sluice according to a first exemplary embodiment with a linear guide, wherein a cellular wheel is in an operational position.

A cellular wheel sluice marked 1 as a whole in FIGS. 1 to 6 has a housing 2 with an interior 3, into which an inlet designed as an inlet shaft 4 opens out and from which an outlet designed as an outlet shaft 5 opens out. The inlet shaft 4 and the outlet shaft 5 can be connected to other components carrying the bulk material via flange connections. The bulk material flows through the cellular wheel sluice 1 from the inlet shaft 4 through the interior 3 to the outlet shaft 5 along a material flow direction 6.

The interior 3 of the housing 2 is substantially cylindrical with a longitudinal axis 7 running perpendicular to the material conveying direction 6 as the axis of symmetry. A cellular wheel 8 with a shaft 9 extending along the longitudinal axis 7 and webs 10 projecting radially therefrom is arranged in the interior 3. In an operational position of the cellular wheel 8 shown in FIGS. 1 to 3, it can be driven around the shaft 9 by means of a cellular wheel drive 11. For this purpose, a coupling pin 12, which extends the shaft 9 and is visible in FIG. 4, engages in a complementary receptacle of a drive connection of the cell drive 11, which is not shown in detail. The coupling pin 12 and the receptacle 13 are arranged concentrically with respect to the longitudinal axis 7 and are mechanically coupled to each other for conjoint rotation with respect to the longitudinal axis 7. In particular, the coupling pin 12 has a non-circular outer contour in a plane oriented perpendicular to the longitudinal axis 7. The drive device is driven by a drive motor 14 via a reduction gear 15 and a power transmission element, not shown, in particular a chain drive, a belt drive and/or an intermediate shaft.

The coupling pin 12 is guided through a side cover 16 of the housing 2. The side cover 16 is also referred to as the drive side cover 16, since the cellular wheel drive 11 is arranged thereon and, in particular, held thereon. The side cover 16 is releasably fastened to the housing 2, in particular by means of several fastening elements, not shown in detail, in particular several screw connections.

The free shaft end of the shaft 9 opposite the coupling pin 12 is mounted in a bearing 17 so that it can rotate but cannot move axially. The bearing 17 is supported by a side cover 18 that closes the housing 2. The side cover is also referred to as the extraction side cover 18. The free shaft end projecting axially from the bearing 17 is covered by a cover cap 19 fitted to the bearing 17. Like the drive side cover 16 in particular, the extraction side cover 18 is releasably fastened to the housing 2 with at least one fastening element, not shown. Alternatively, a twist lock, in particular an integrated one, can be used to fasten the extraction side cover 18.

According to an exemplary embodiment, not shown, the cellular wheel 8 can be attached to the drive side cover 16. The releasable coupling with coupling pin 12 and receptacle 13 is then unnecessary. Such a design is mechanically less complicated.

Figure 4:
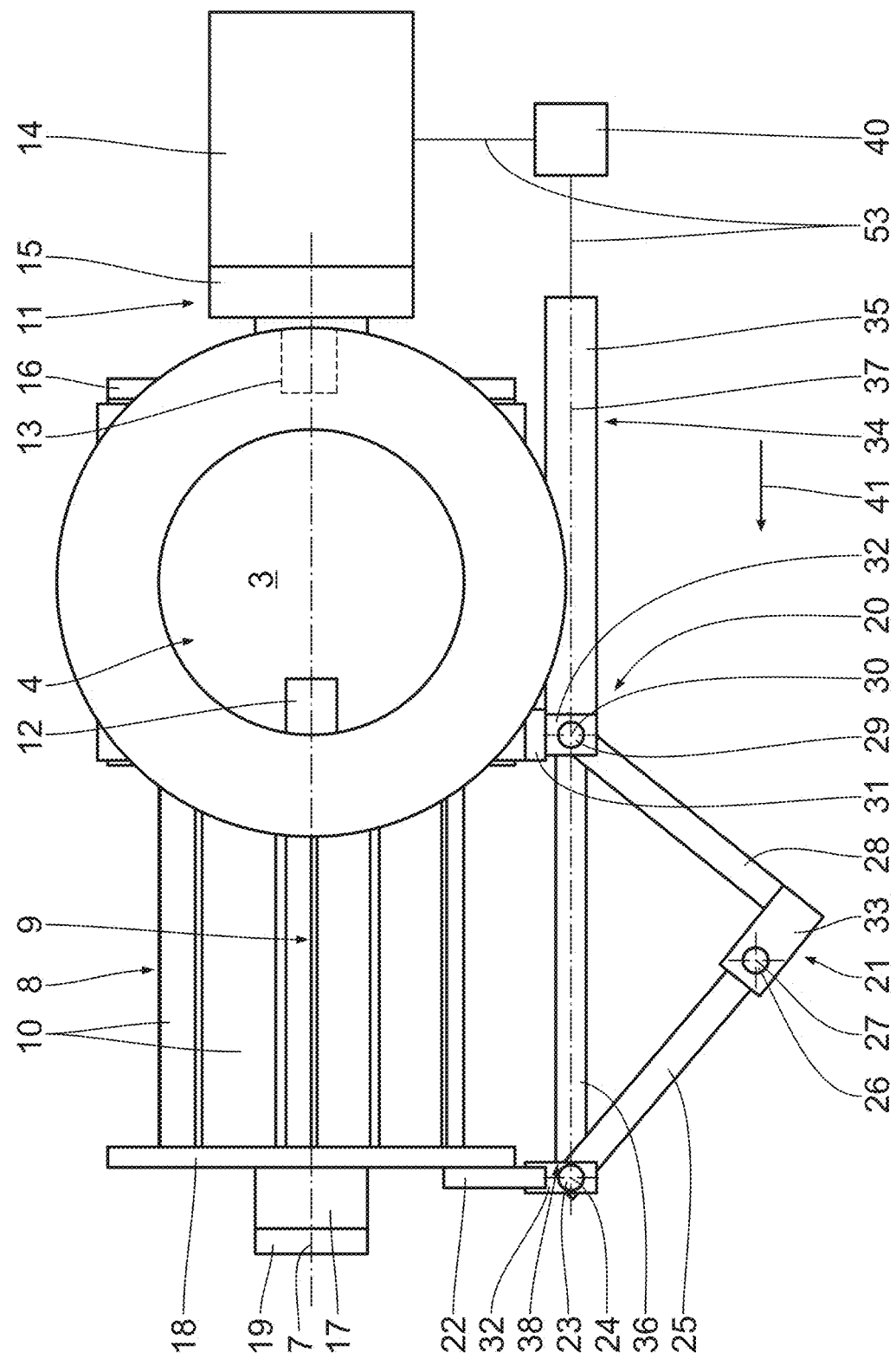
FIG. 4 shows a view of the cellular wheel sluice corresponding to FIG. 2 with the cellular wheel in an extracted position.
Figure 5:
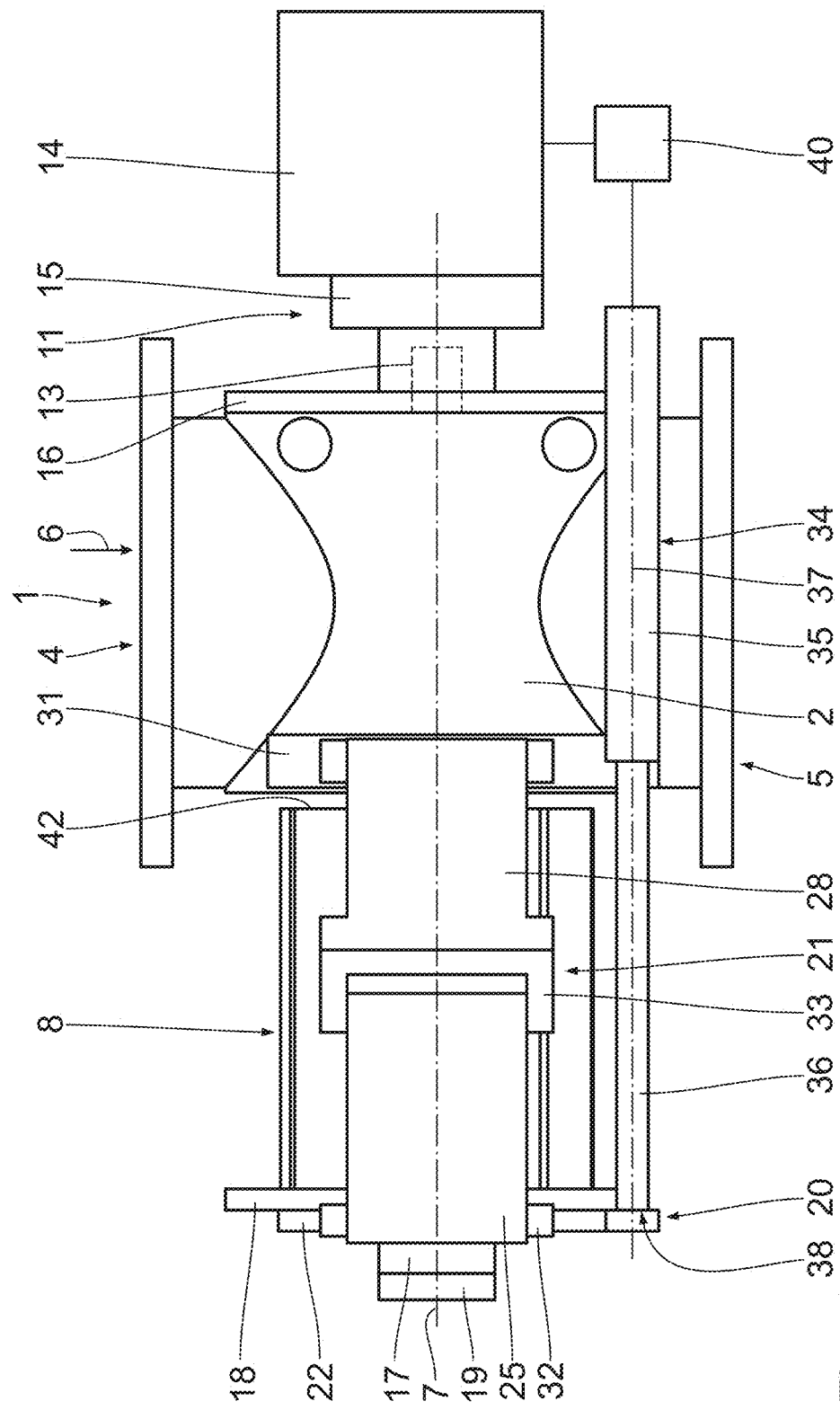
FIG. 5 shows a side view of the cellular wheel sluice in the extracted position corresponding to FIG. 3.

The cellular wheel 8 is movably arranged in the housing 2 via the extraction side cover 18 and an extraction device 20 in such a way that it can be continuously displaced between the operational position and an extracted position shown in FIGS. 4 and 5.

The extraction device 20 comprises a guide unit 21 which, according to the exemplary embodiment shown, has a hinge-like design. The guide unit 21 has a first connecting member 22, which is mounted on the extraction side cover 18 by means of connecting elements, in particular fastening screws, which are not shown. The first connecting member 22 can also be welded to the extraction side cover 18. Via a first joint 23 with a first joint axis 24, a first connecting plate 25 is pivotably articulated to the first connecting member 22. A second connecting plate 28 is pivotably articulated to the first connecting plate 25 via a second joint 26 with a second joint axis 27. The connecting plates 25, 28 are joint elements of the guide unit 21. The second connecting plate 28 is pivotably articulated to a second connecting member 31 via a third joint 29 with a third joint axis 30. The second connecting member 32 is fixedly mounted on the housing 2.

The three joint axes 24, 27, 30 run parallel to each other and are oriented in particular perpendicular to the longitudinal axis 7, to which they run at an angle.

The guide unit 21 is a vertical guide, which is defined by the three joint axes 24, 27, 30 and supported by the joints 23, 26, 29. Horizontal guidance is not provided by the guide unit 21, but by the webs of the cellular wheel 8 in the housing opening. For this purpose, it can be advantageous if the cellular wheel has a conical contour. In addition, guidance can be provided by means of a drive, which is explained in greater detail below.

The joints 23, 26, 29 can each be designed as a bolt connection, wherein a round bolt extending along the joint axis 24, 27, 30 can be used in each case. The connecting plates 25, 28 are each arranged on lug-like elements 32 of the connecting members 22, 31 and are held by means of the bolt.

The two connecting plates 25, 28 are connected to one another in particular by a connecting frame 33 being attached to the second connecting plate 28. The connecting frame 33 is substantially C-shaped or clamp-like in design and engages around the first connecting plate 25 in the axial direction with respect to the second joint axis 27. The connecting frame 33 is arranged on the second connecting plate 28 in particular in such a way that the second joint axis 27 is arranged outside a plate plane defined by the second connecting plate 28.

In particular, the connecting frame 33 is fixed and in particular not hinged to the second connecting plate 28. According to the exemplary embodiment shown, the connecting frame 33 and the second connecting plate 28 form a 90° angle, which remains unchanged even if the cellular wheel 8 is displaced from the housing.

In the operational position, the connecting plates 25, 28 are oriented parallel to each other and, in particular, perpendicular to the longitudinal axis 7. In particular, the joint axes 24, 27 are spaced apart in a plate plane defined by the first connecting plate 25.

It is understood that the connecting frame 33 could also be attached to the first connecting plate 25, so that in particular the second joint axis 27 could be arranged in a plate plane defined by the second connecting plate 28.

The extraction device 20 has an extraction drive 34 which, according to the exemplary embodiment shown, is designed as a linear drive in the form of a pneumatic cylinder. The extraction drive 34 comprises a drive housing 35, which is fixedly connected to the housing 2. The extraction drive 34 is fixed to the housing of the cellular wheel sluice 1. A piston rod 36 is arranged in the drive housing 35 so that it can be displaced along a longitudinal drive axis 37. With a free end 38 projecting from the drive housing 35, the piston rod 36 of the extraction drive 34 is attached to the first connecting member 22. As shown in FIG. 1, the piston rod 36 can be attached directly to the first connecting member 22. The first connecting member 22 is in particular plate-like and in particular rigid in itself.

Alternatively, it is possible for the piston rod 36 to be connected to the first connecting member 22 in an articulated manner, in particular by means of a lug-like element 32 or by means of an articulated ball head arrangement.

In particular, the extraction drive 34 is attached to the housing 2 in such a way that the longitudinal drive axis 37 intersects the first joint axis 24 and the third joint axis 30 and/or the longitudinal drive axis 37 is oriented parallel to the longitudinal axis 7.

In the extracted position, the extraction side cover 18 is arranged to pivot about the first joint axis 24. For this purpose, a pivot drive 39, not shown in detail, can be formed on the cellular wheel sluice 1. In particular, the pivot drive 39 is integrated in the first joint 23 and enables a rotary movement about the first joint axis 24.

Advantageously, the extraction drive 34, in particular the piston rod 36, is releasably connected to the first connecting member 22. To allow the extraction side cover 18 to pivot, in particular freely, the piston rod 36 can be released from the first connecting member 22, as shown in FIG. 6.

Figure 6:
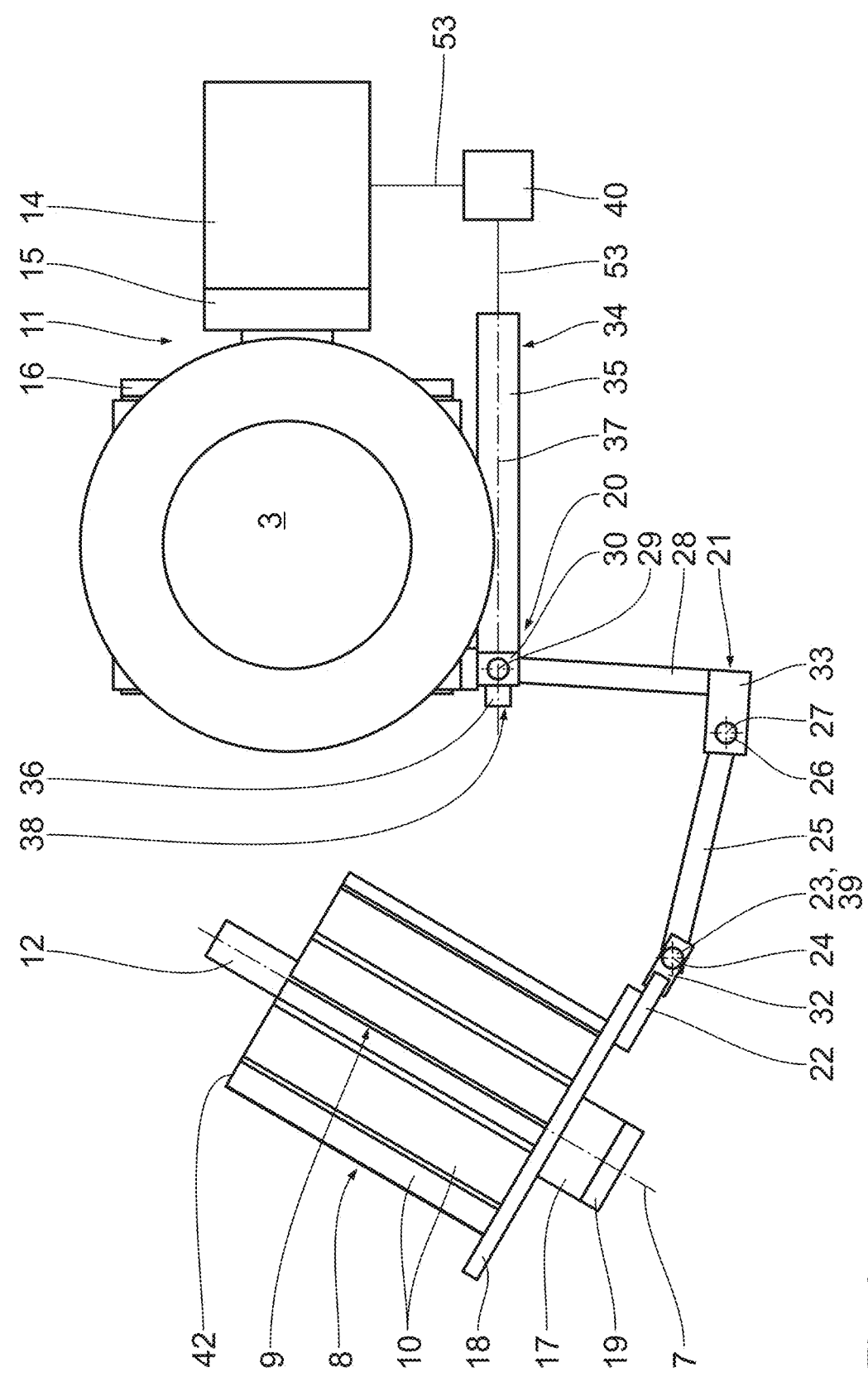
FIG. 6 shows a top view corresponding to FIG. 4 in a pivot position of the cellular wheel.
Figure 7:
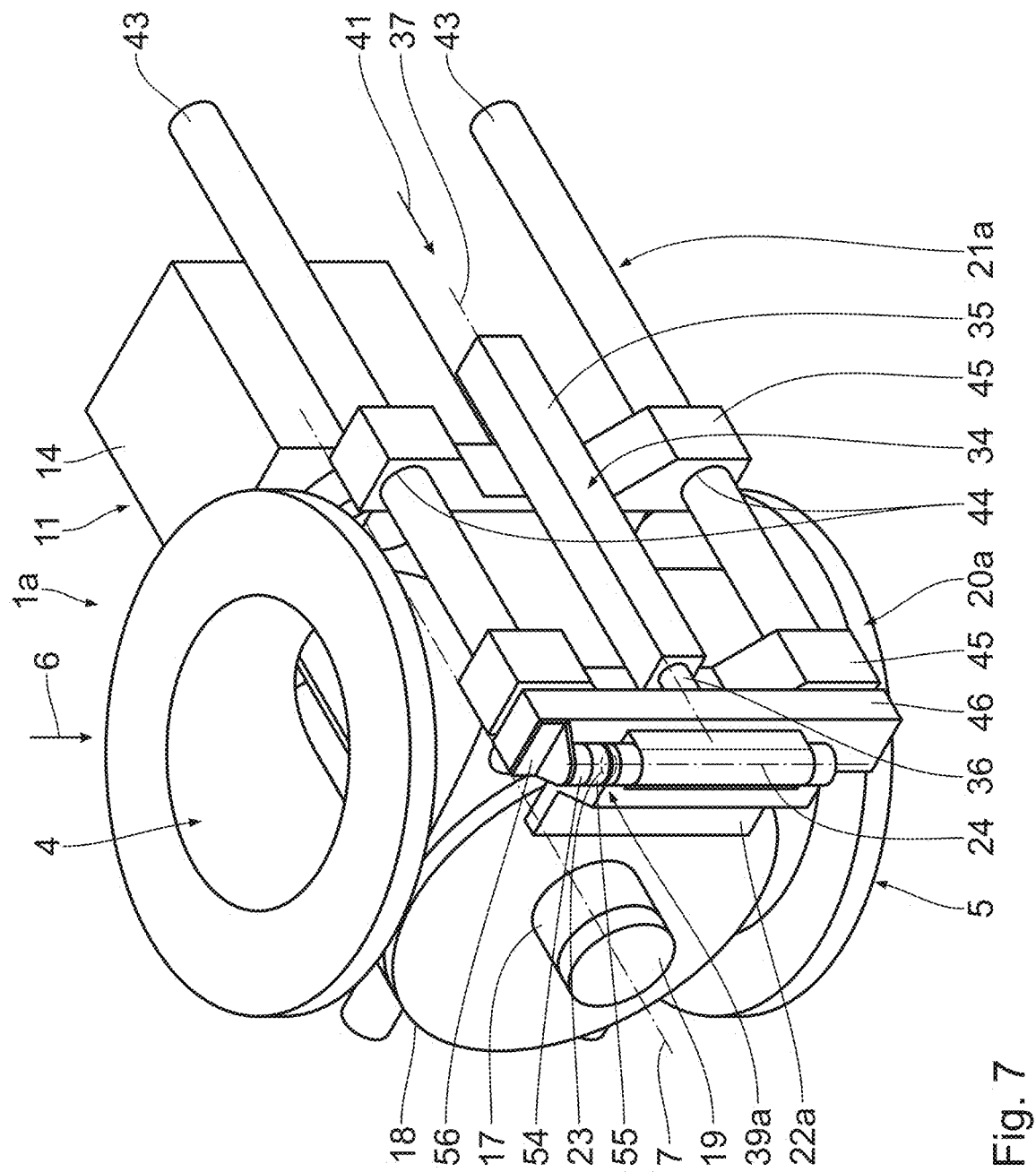
FIG. 7 shows a view of a cellular wheel sluice corresponding to FIG. 1 according to a second exemplary embodiment with a linear guide.
Figure 8:
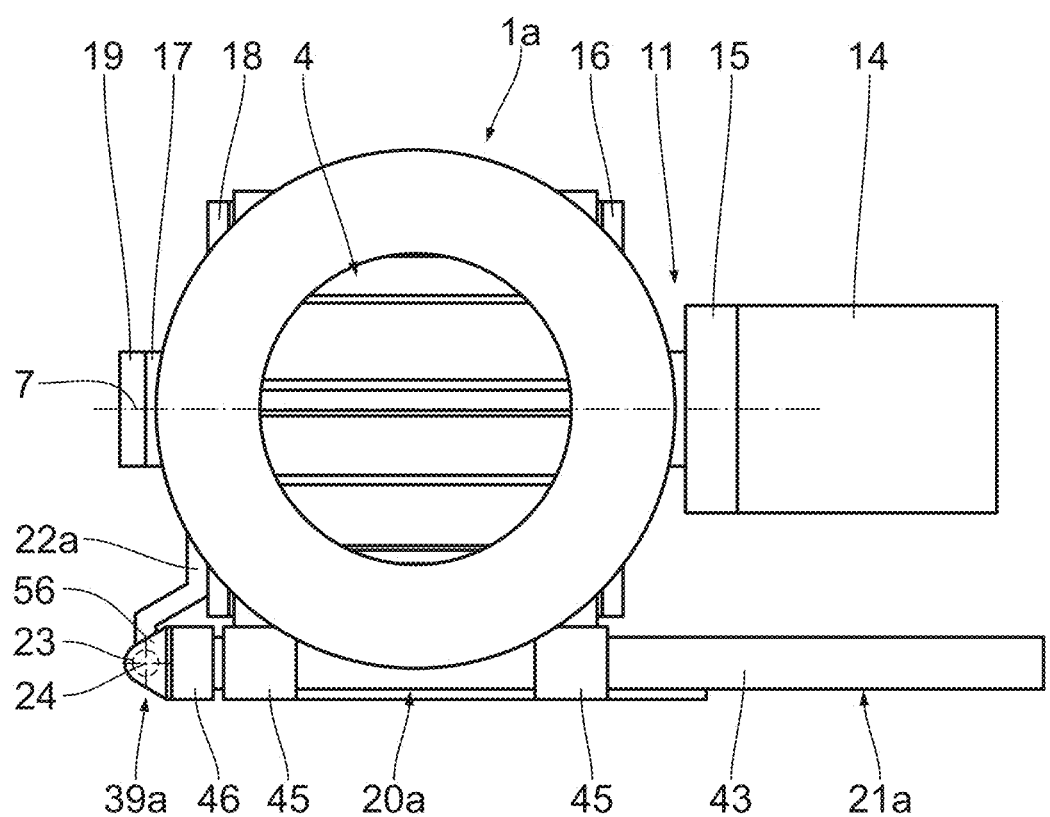
FIGS. 8 and 9 show views of the cellular wheel sluice according to FIG. 7 in an operational position corresponding to FIGS. 2 and 3.
Figure 9:
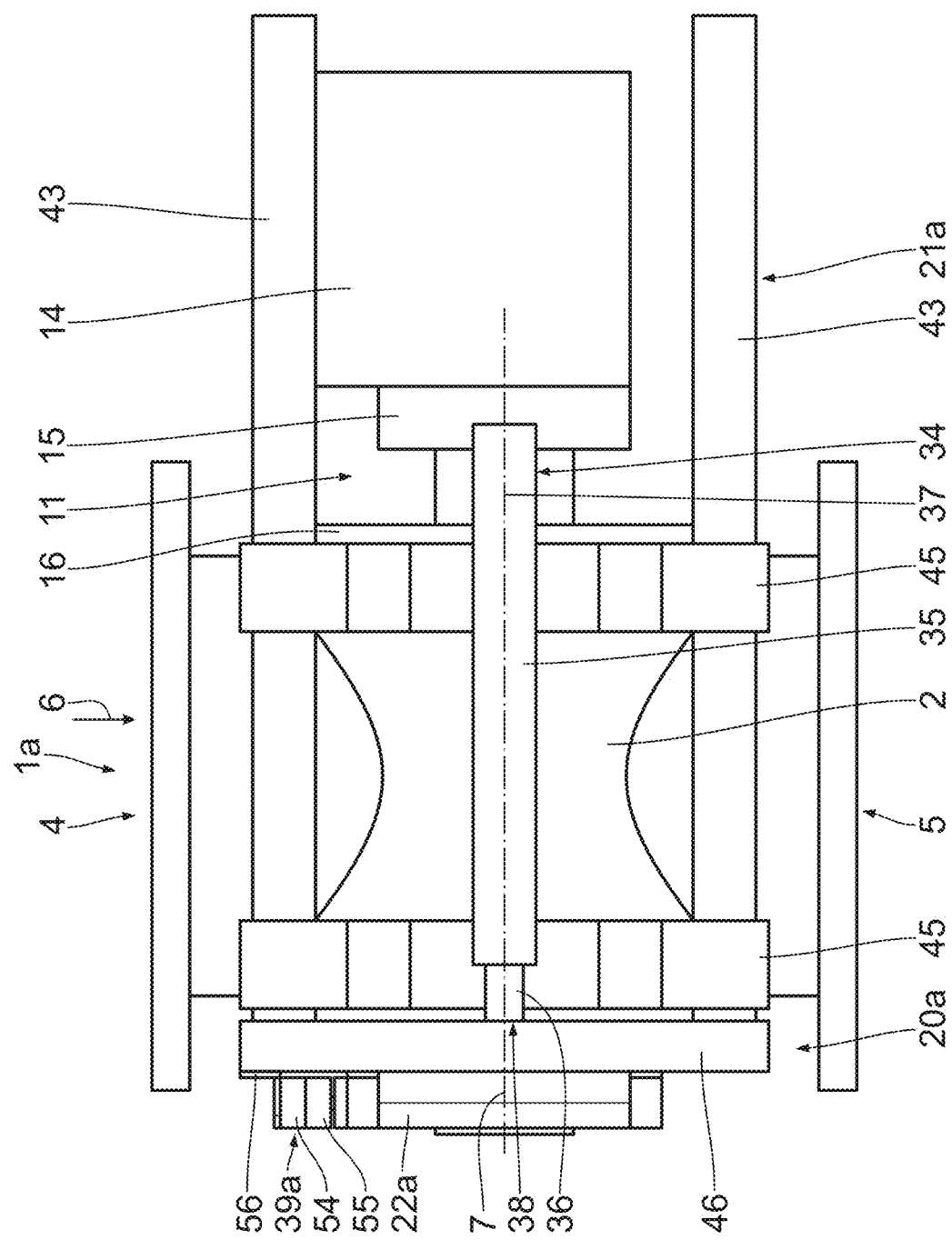
Figure 10:
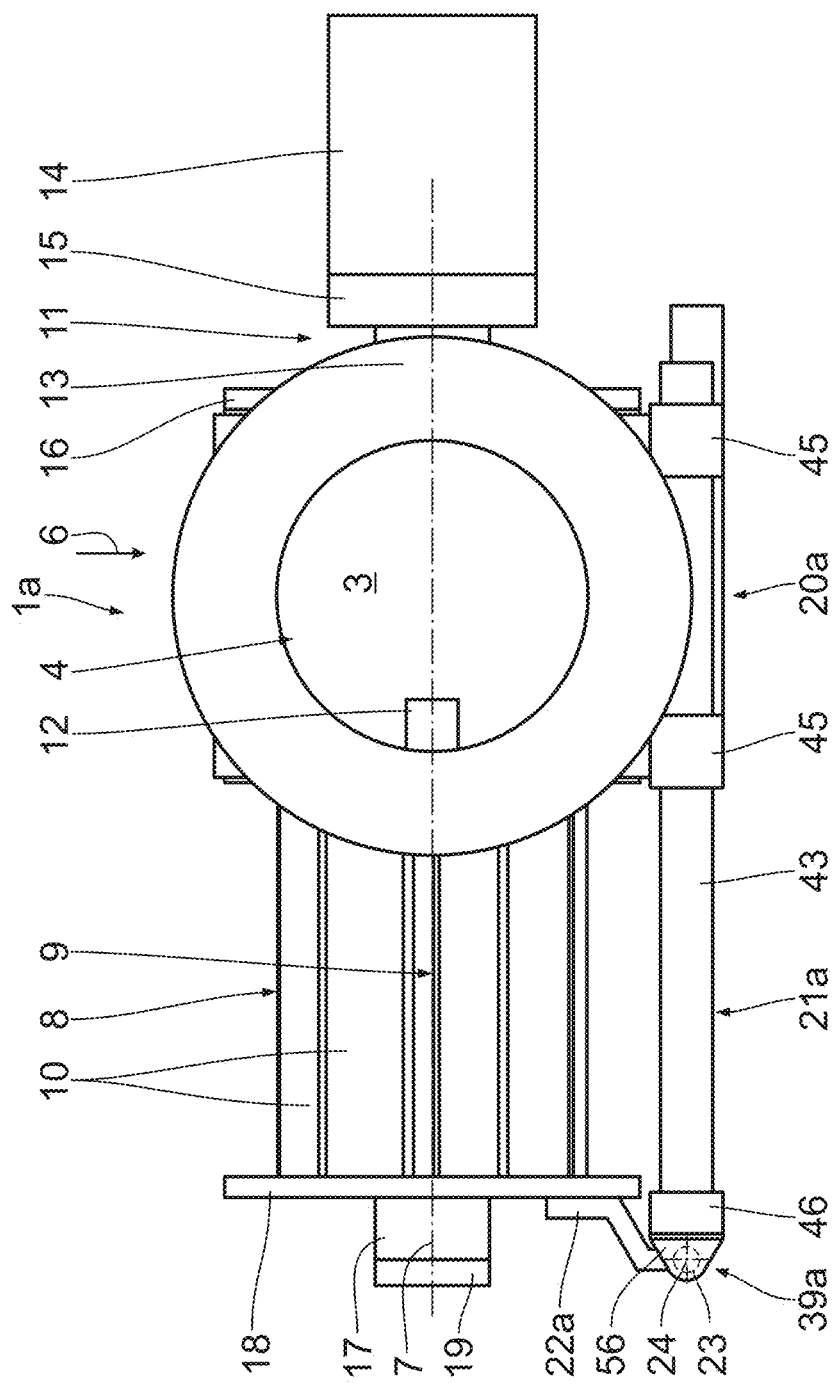
FIGS. 10 and 11 show views of the cellular wheel sluice according to FIG. 7 in an extracted position corresponding to FIGS. 8 and 9.
Figure 11:
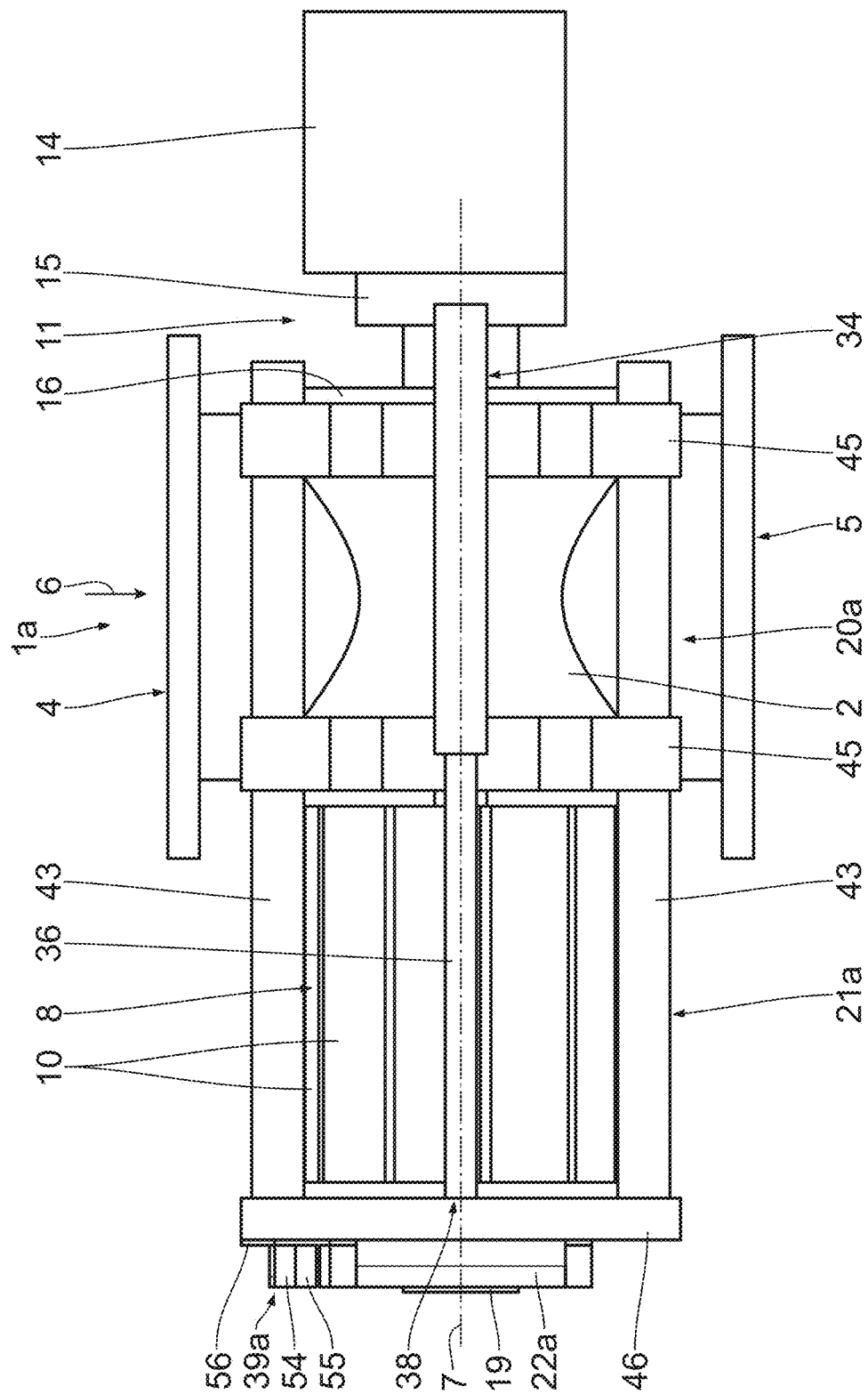
Figure 12:
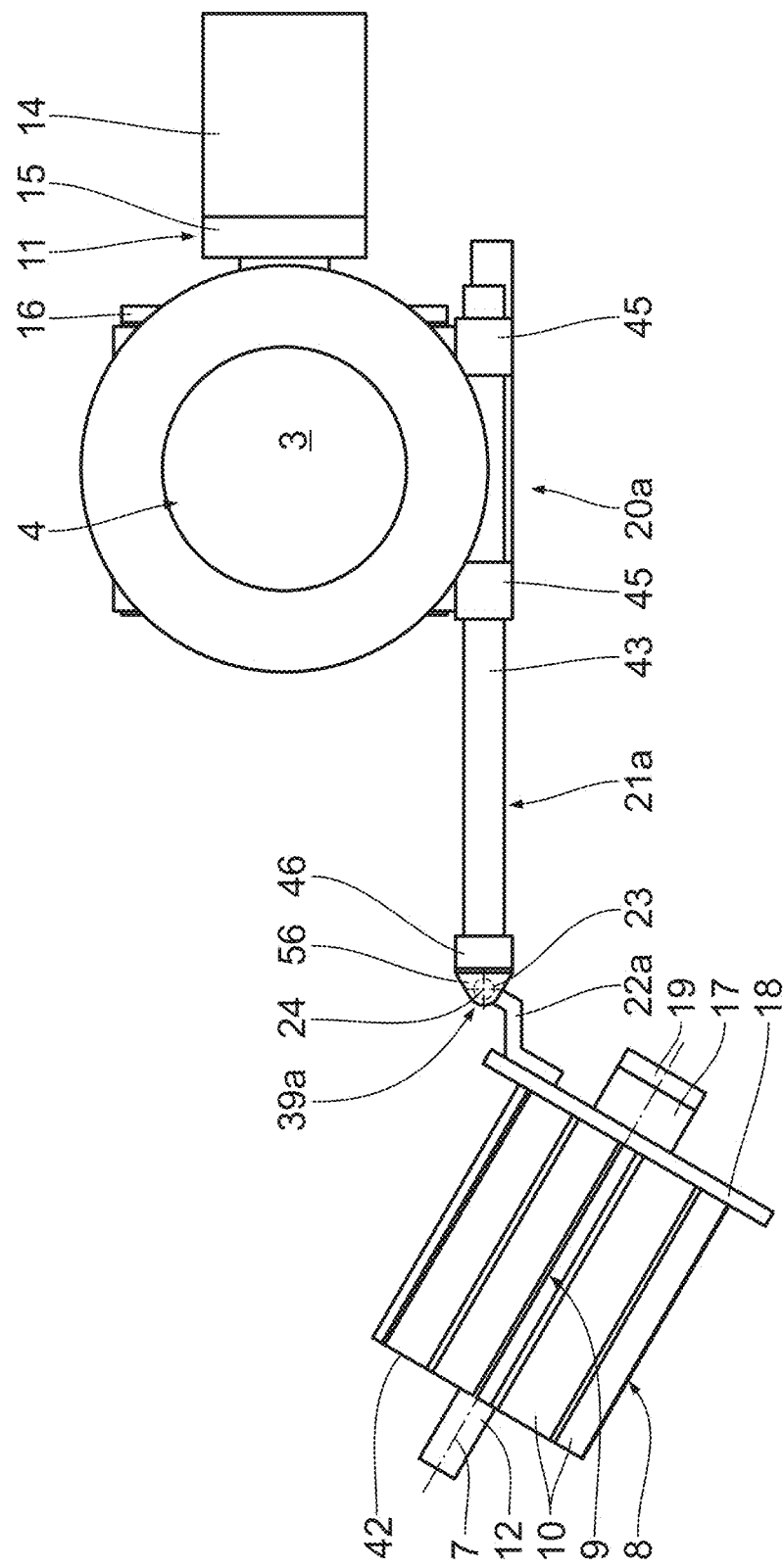
FIG. 12 shows a view of the cellular wheel sluice in a pivot position corresponding to FIG. 10.

The cellular wheel sluice 1 has a control unit 40, which is shown purely schematically in FIG. 6. The control unit 40 is connected to both the cellular wheel drive 11 and the extraction drive 34 by means of signal lines 53. The control unit 40 can be used for automatic and, in particular, fully automatic clearing of the cellular wheel 8.

A method for clearing the cellular wheel 8 of the cellular wheel sluice 1 is explained in greater detail below with reference to FIGS. 1 to 6.

Figure 2:
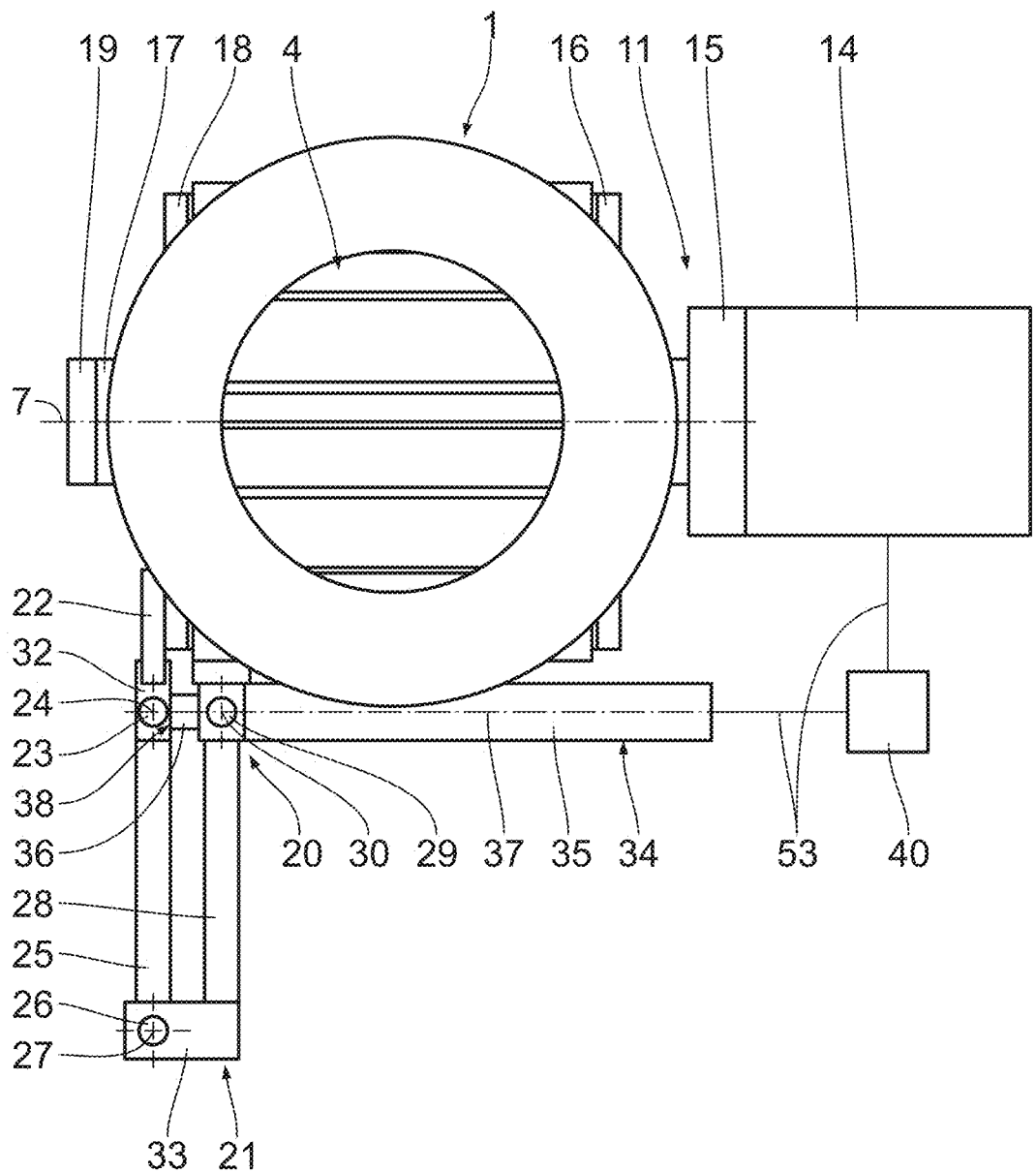
FIG. 2 shows a top view of the cellular wheel sluice as shown in FIG. 1.
Figure 3:
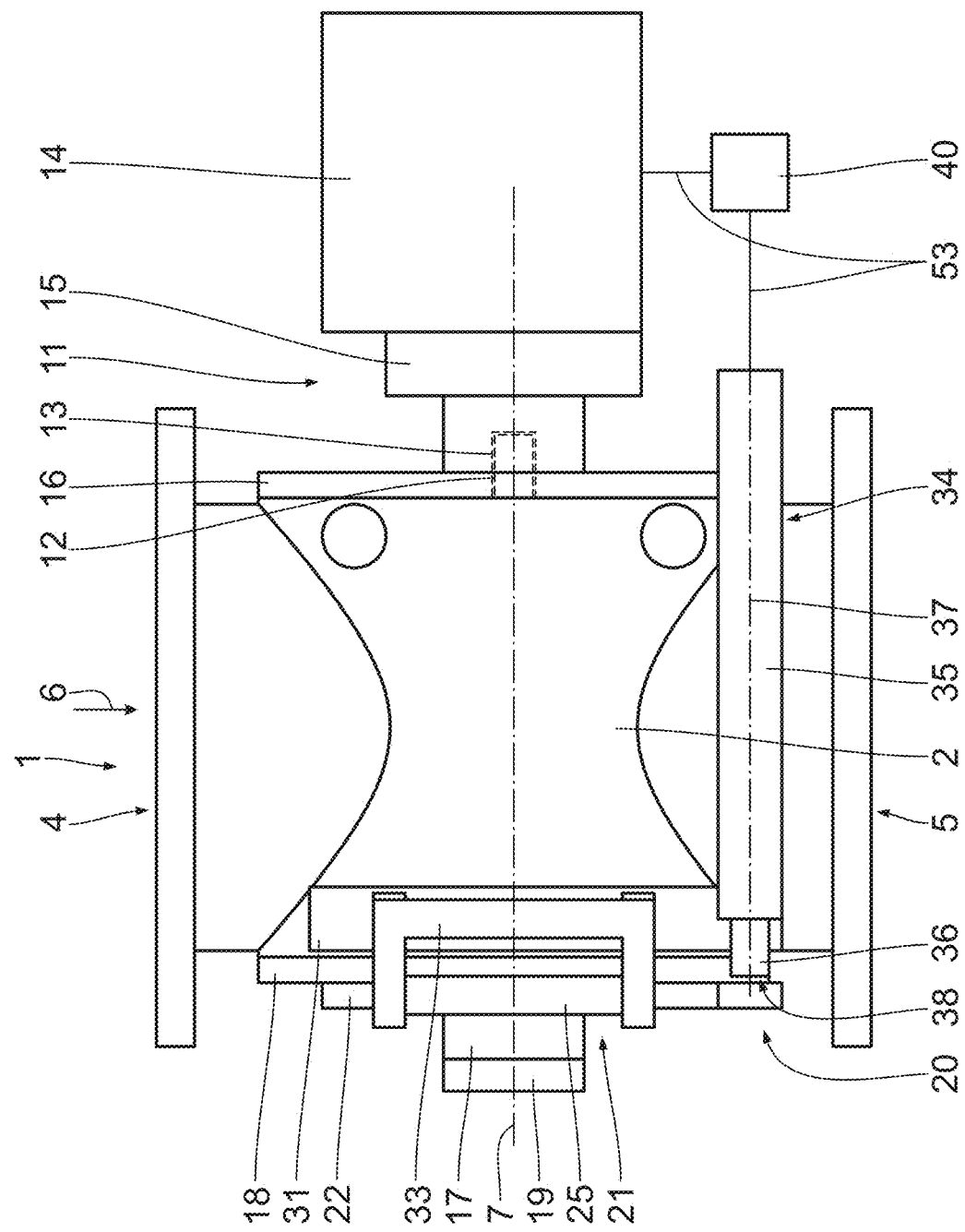
FIG. 3 shows a side view of the cellular wheel sluice as shown in FIG. 1.

Starting from the arrangement of the cellular wheel 8 in the housing 2 of the cellular wheel sluice 1 in the operational position as shown in FIGS. 1 to 3, the first step is to release the extraction side cover 18 from the housing 2. To do this, the fastening elements and/or the twist lock are released. Advantageously, the extraction side cover 18 is released automatically, in particular controlled by the control unit 40. The extraction side cover 18 is then unlocked from the housing 2.

By actuating the extraction drive 34, the piston rod 36 is moved out of the drive housing 35, thereby displacing the first joint axis 24 away from the third joint axis 30 along the longitudinal drive axis 37. Since the extraction drive 34 engages with the piston rod 36 on the first connecting member 22, which is fixedly arranged on the extraction side cover 18, the extraction side cover 18 with the cellular wheel 8 held on it is displaced away from the housing 2. The displacement takes place along an extraction direction 41, which is oriented parallel to the longitudinal axis 7. It is advantageous that the extraction drive 34 is attached to the housing 2 in such a way that the longitudinal drive axis 37 is oriented parallel to the longitudinal axis 7. Actuation of the extraction drive 34 directly causes the displacement of the cellular wheel 8 along the extraction direction 41.

In the extracted position according to FIGS. 4 and 5, the cellular wheel 8 is arranged completely outside the housing 2 in the axial direction in relation to the longitudinal axis 7. In particular, an end face 42 of the cellular wheel 8 opposite the extraction side cover 18 is arranged outside the interior 3 in the extracted position. It is conceivable that, in the extracted position, the coupling pin 12 is arranged at least partially inside the interior 3, as shown in FIG. 4.

In the extracted position, the extraction drive 34, in particular the piston rod 36, is released from the first connecting element 22. For this purpose, the piston rod 36 is coupled to the first connecting member 22, for example by means of a bolt or latching connection. The mechanical release of the piston rod 16 from the first connecting member 22 can be performed manually and/or automatically.

If the piston rod 36 is coupled to the first connecting member 22 in an articulated manner, the components can remain connected to each other when the extraction side cover 18 is pivoted.

The cellular wheel 8 is in a pivot position. The cellular wheel 8 and the extraction side cover 18 can be pivoted relative to the extraction device 20 and, in particular, relative to the housing 2. In the plan view shown in FIG. 6, the cellular wheel 8 is pivoted counterclockwise about the first joint axis 24 away from the housing 2. The first joint axis 24 is also referred to as the side cover joint axis 24. This improves the accessibility of the housing 2 and the interior 3 on the one hand and the accessibility of the cellular wheel 8 on the other. Cleaning and/or maintenance work on the cellular wheel 8 and/or on the housing 2 is thus facilitated.

The pivot movement can be automatically driven by the pivot drive 39. The pivot drive 39 is also referred to as a side cover pivot drive 39.

The cellular wheel 8 is moved back into the housing 2 in the reverse order. The cellular wheel 8 is pushed into the housing 2 along an insertion direction that is oriented in the opposite direction to the extraction direction 41. So that the coupling pin 12 can be inserted axially into the drive connection 13, the cellular wheel drive 11 can be rotated around the longitudinal axis 7 in an angle of rotation range of, for example, 20° to 30°, in particular several times and in particular until a required angle of rotation position has been reached.

The control unit 40 enables partially or fully automatic operation for extracting and/or pivoting the cellular wheel.

In particular, it is conceivable that the cellular wheel drive 11 with the drive side cover 16 is also arranged on the housing 2 so as to be rotatable and/or extractable. For this purpose, a corresponding extraction device can be provided, which can be designed in particular analogously and in particular identically to the extraction device 20. It is also conceivable that the guide unit 21 and/or the extraction drive 34 or components thereof are used equally for both side covers 16, 18.

With reference to FIGS. 7 to 12, a second exemplary embodiment of the invention is described below. Structurally identical parts are given the same reference signs as in the first exemplary embodiment, to the description of which reference is hereby made. Structurally different but functionally identical parts are given the same reference signs with a following letter "a".

One difference with the cellular wheel sluice 1a is that the guide unit 21a is designed as a linear guide and has two guide rods 43, each of which can be displaced along the extraction direction 41 in two aligned bearings 44. There can also be more than two guide rods 43.

The bearing points 44 are each arranged in pairs for the various guide rods 43 in a guide yoke 45. Fewer than two or more than two bearing points can also be formed on a guide yoke. A bushing, a plain bearing or a linear ball bearing can be arranged in the bearing points 44. The two guide yokes 45 are attached to the housing 2 at a distance from each other along the extraction direction 41.

The guide rods 43 are arranged at a distance from one another along the material conveying direction 6. According to the exemplary embodiment shown, the guide rods 43 are arranged at a distance from one another in the vertical direction and are fastened to an outer side of the housing 2.

The guide rods 43 are each attached with a free end to a crossbar 46. The extraction drive 34 is also attached to the crossbar 46, in particular the free end 38 of the piston rod 36. Actuation of the extraction drive 34 causes an axial displacement of the crossbar 46, wherein this displacement is guided along the extraction direction 41 by means of the guide rods 43 in the bearing points 44.

The first connecting member 22a is hinged to the crossbar 46 so that it can pivot about the first joint axis 24. The pivot drive 39a is arranged on the first joint 23, in particular concentrically to the first joint axis 24. The pivot drive 39a is arranged above or below the lug-like element of the connecting member 22a. The pivot drive 39a comprises a rotary drive 45, which is actuated pneumatically in particular. Alternatively, the rotary drive can also be driven electrically or hydraulically. The rotary drive 54 has a rotatable drive axis, not shown, which runs concentrically to the first joint axis 24. The drive axis has a non-circular outer contour and engages in a corresponding opening of a rotary element 55. The rotary drive 54 and the mechanically interacting rotary element 55 form the pivot drive 39a.

The pivot drive 39a is attached to the crossbar 46 by means of a drive mounting 56. With the drive mounting 56, the pivot drive 39a is arranged both axially and radially defined with respect to the first joint axis 24.

The actuation of the extraction device 20a of the cellular wheel 1a is substantially identical to the extraction device of the previous exemplary embodiment. The guided displacement of the cellular wheel 8 takes place by means of the linear guide 21a through the guide rods 43.

To allow the cellular wheel 8 to pivot relative to the extraction device 20a and, in particular, relative to the housing 2, it is not necessary to release the extraction drive 34 from the crossbar 46. Pivoting is thus simplified and, in particular, more fail-safe. Additional intermediate steps for pivoting are unnecessary.

When the cellular wheel 8 is displaced relative to the housing 2, the longitudinal axis 7 is oriented parallel to the extraction direction 41. The cellular wheel 8 is in a non-pivoting arrangement. This non-pivoting arrangement can be stabilized by means of at least one stabilizing element, in particular in order to prevent unintentional pivoting caused by gravity, in particular as a result of an inclined arrangement of the cellular wheel 8. Such a stabilizing element comprises, in particular, at least one magnetic stop which holds the extraction side cover 18a with the cellular wheel 8 attached thereto relative to the extraction device 20a in the non-pivoted arrangement. The at least one magnetic stop comprises a first magnetic element, which is arranged in the region of the extraction side cover 18a, and a second magnetic element, which corresponds to the first magnetic element and which is arranged in particular in the region of the extraction device 20a. The transfer of the cellular wheel 8 with the extraction side cover 18a from a pivoted arrangement back into the non-pivoted arrangement simplifies the re-introduction of the cellular wheel 8 into the housing 2.

Figure 13:
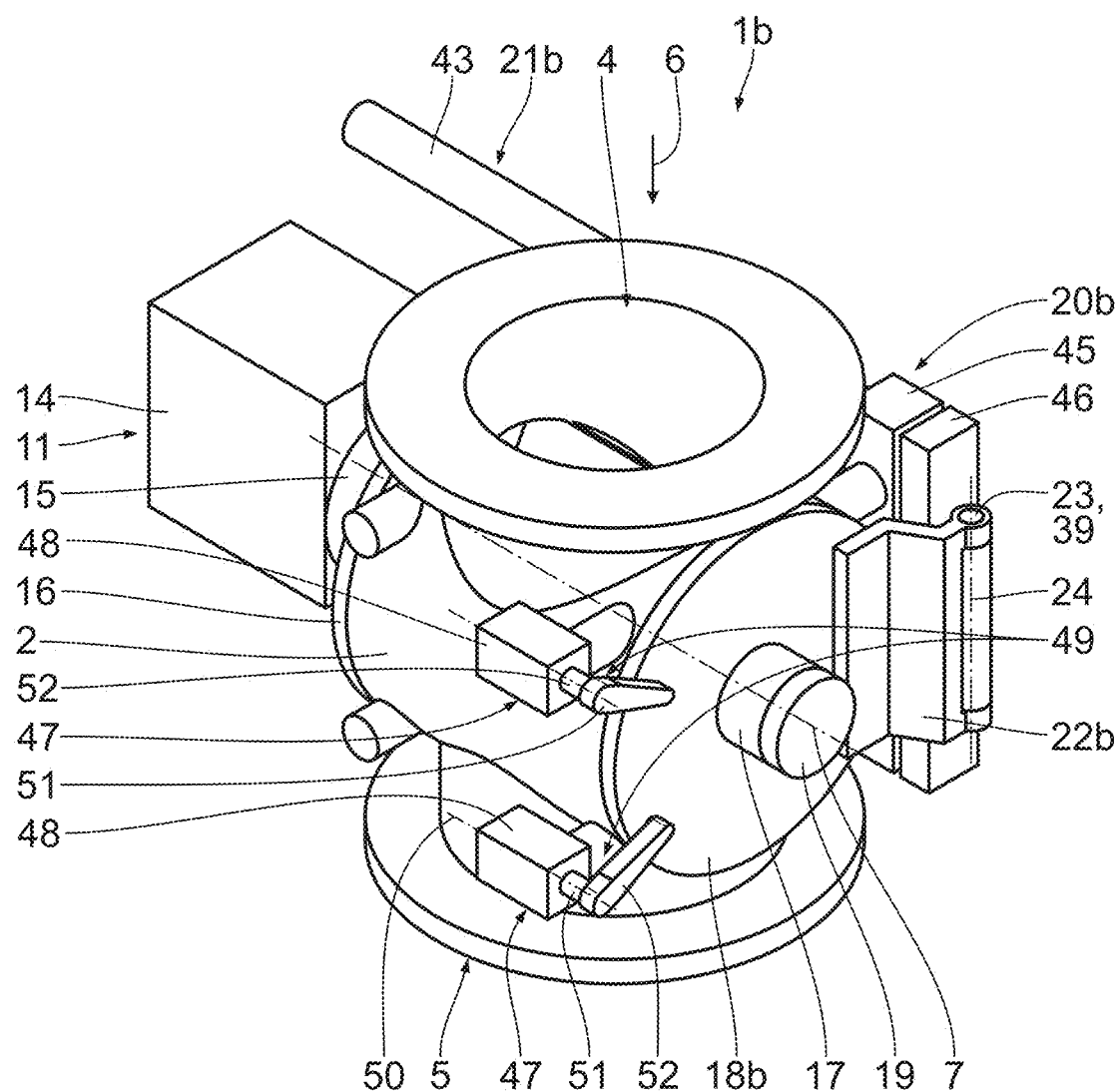
FIG. 13 shows a perspective view of a cellular wheel sluice according to a third exemplary embodiment with a linear guide and two fastening elements for the extraction side cover.
Figure 14:
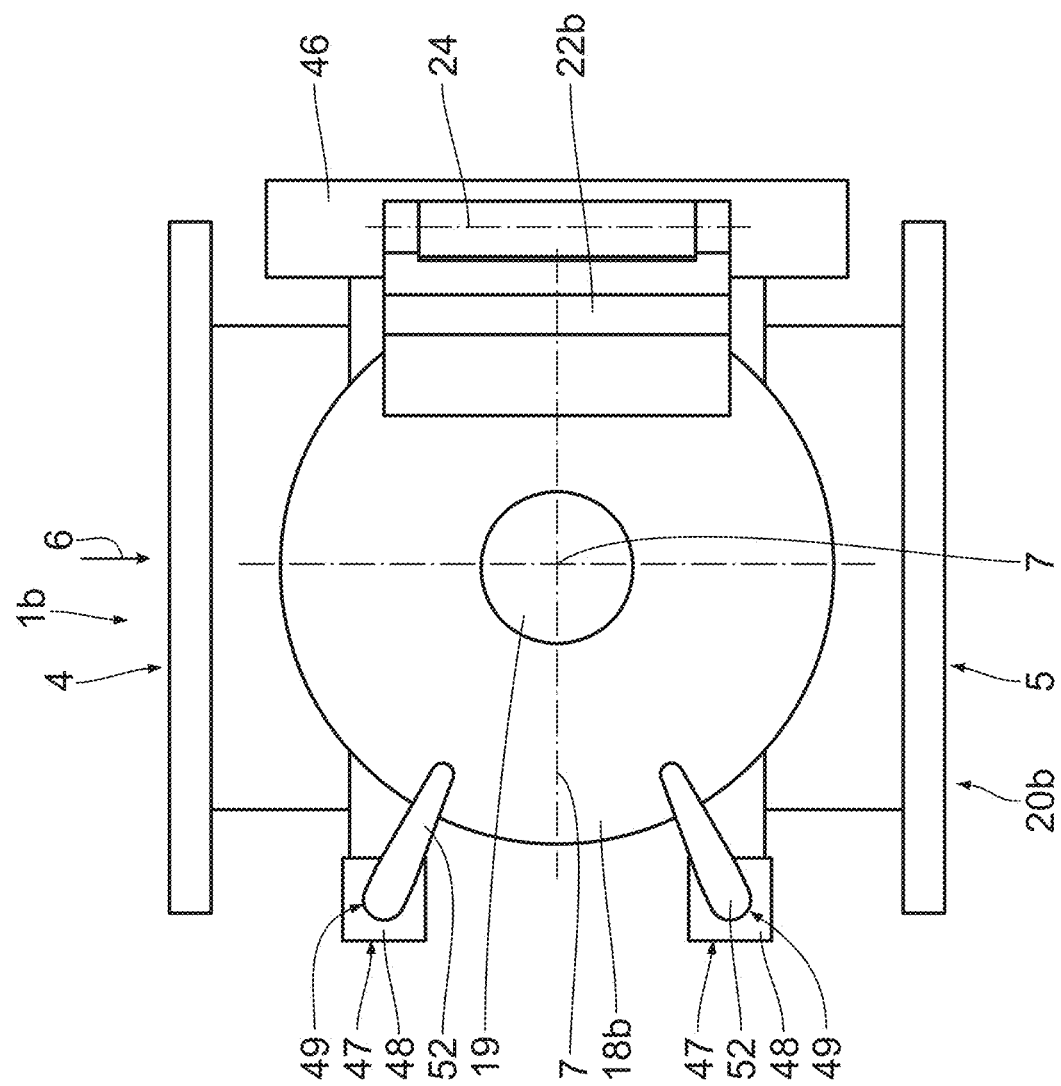
FIG. 14 shows a front view of the cellular wheel sluice according to FIG. 13.
Figure 15:
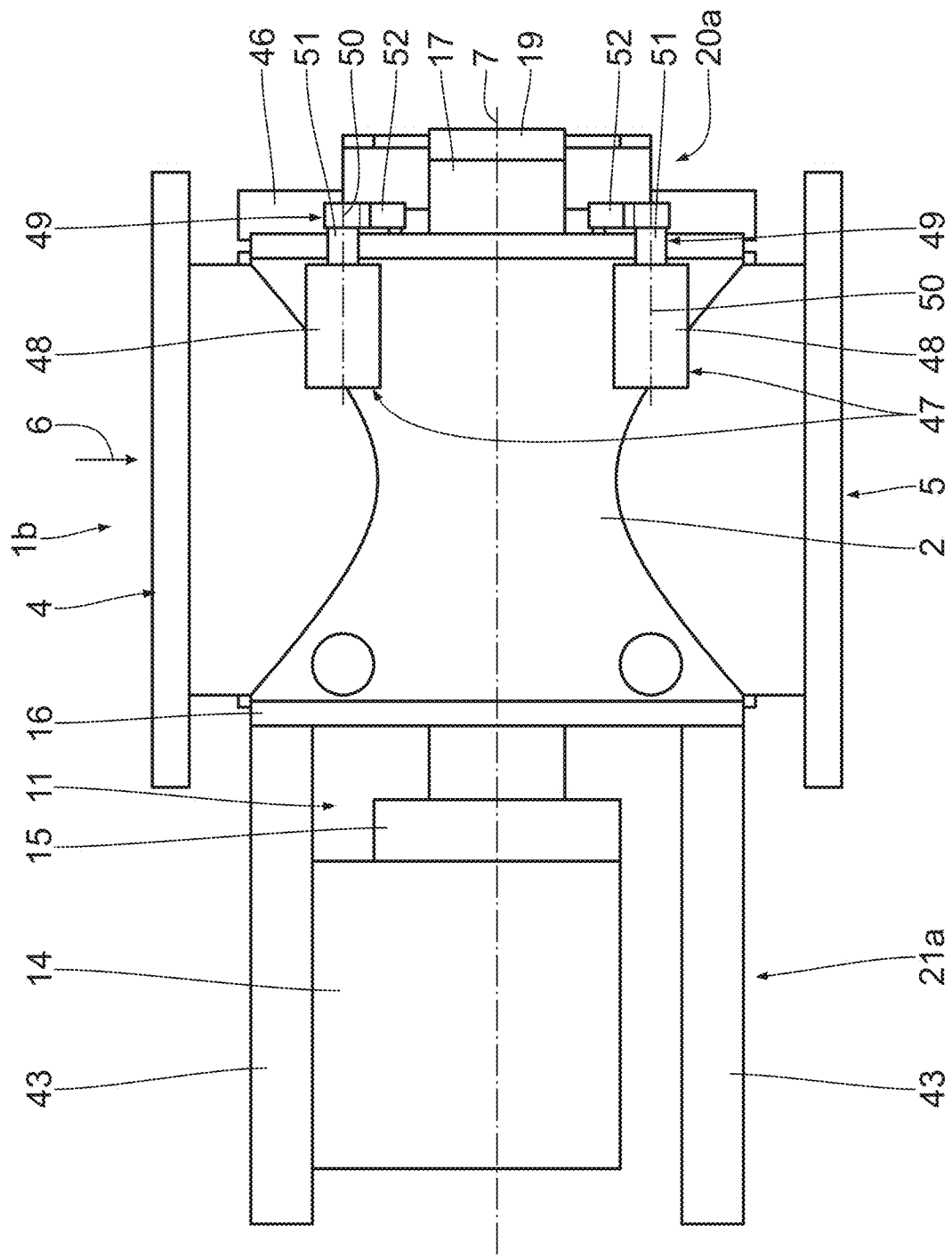
FIG. 15 shows a side view of the cellular wheel sluice according to FIG. 13.

With reference to FIGS. 13 to 15, a third exemplary embodiment of the invention is described below. Structurally identical parts are given the same reference signs as in the previous exemplary embodiments, to the description of which reference is hereby made. Structurally different but functionally identical parts are given the same reference signs followed by a letter "b".

The cellular wheel sluice 1b has a guide unit 21b, which is designed as a linear guide according to the previously described exemplary embodiment.

The extraction side cover 18b is locked with at least one fastening element 47 and in particular with two fastening elements 47, which are fastened to the housing 2. More than two fastening elements 47 can also be arranged on the housing 2. The fastening elements 47 are each designed as pivot clamps and have a fastening element housing 48 and a clamping element 49 that can be displaced relative to the fastening element housing 48. The clamping element 49 is axially displaceable along a longitudinal axis 50 of the fastening element and rotatable about the longitudinal axis 50 of the fastening element. In particular, a fastening element drive, in particular a pneumatic drive, not shown in detail, is used for the displacement and/or rotation of the clamping element 49. In particular, the fastening element drive is in signal connection with the control unit 40.

The fastening elements 47 are arranged on the housing 2 in such a way that the longitudinal axis 50 of the fastening element is oriented in particular parallel to the longitudinal axis 7 and in particular does not intersect the extraction side cover 18b. The fastening element longitudinal axes 50 extend in a radial direction in relation to the longitudinal axis 7 at a distance from the extraction side cover 18b.

The clamping elements 49 are each substantially L-shaped and have an axial portion 51 and a transverse portion 52 fixedly connected thereto. The longitudinal portions 51 are each arranged with a first end inside the fastening element housing 48 and lead out of the latter. The longitudinal portions 51 each extend along the fastening element longitudinal axis 50. The transverse portion 52, which extends transversely and in particular perpendicularly to the fastening element longitudinal axis 50, is arranged at a free end of each of the longitudinal portions 51. The extension of the transverse portion 52 is in particular greater than the radial distance of the respective fastening element longitudinal axis 50 to the extraction side cover 18b. When the clamping element 49 is in a suitable rotational position, the transverse portion 52 is arranged in the region of the extraction side cover 18b, as shown in FIG. 13. In the arrangement of the clamping elements 49 according to FIG. 13, the extraction side cover 18b is reliably and sealingly arranged on the housing 2. The extraction side cover 18b is locked to the housing 2 by the fastening elements 47.

It is possible to automatically unlock the fastening elements 47 by means of the control unit 40, in particular by lifting the clamping elements 49 from the outer surface of the extraction side cover 18b along the longitudinal axis 7 and turning them away from the extraction side cover 18b with a rotation about the longitudinal axis 50 of the fastening elements. In this arrangement, the extraction side cover 18b can be displaced away from the housing 2 by means of the extraction device 20b and thus the cellular wheel 8 can be extracted.

If, in addition or as an alternative to the fastening elements 47, a segment lock or a twist lock, in particular a bayonet lock and/or a screw lock, and/or mechanical locks such as, in particular, a toggle lock, are provided, these can also be automatically unlocked and/or locked by means of the control unit 40.

The fastening elements 47 and/or the various versions of the twist lock can also be arranged on the drive side cover 16 in addition to or as an alternative to the extraction side cover 18b.

Figure 16:
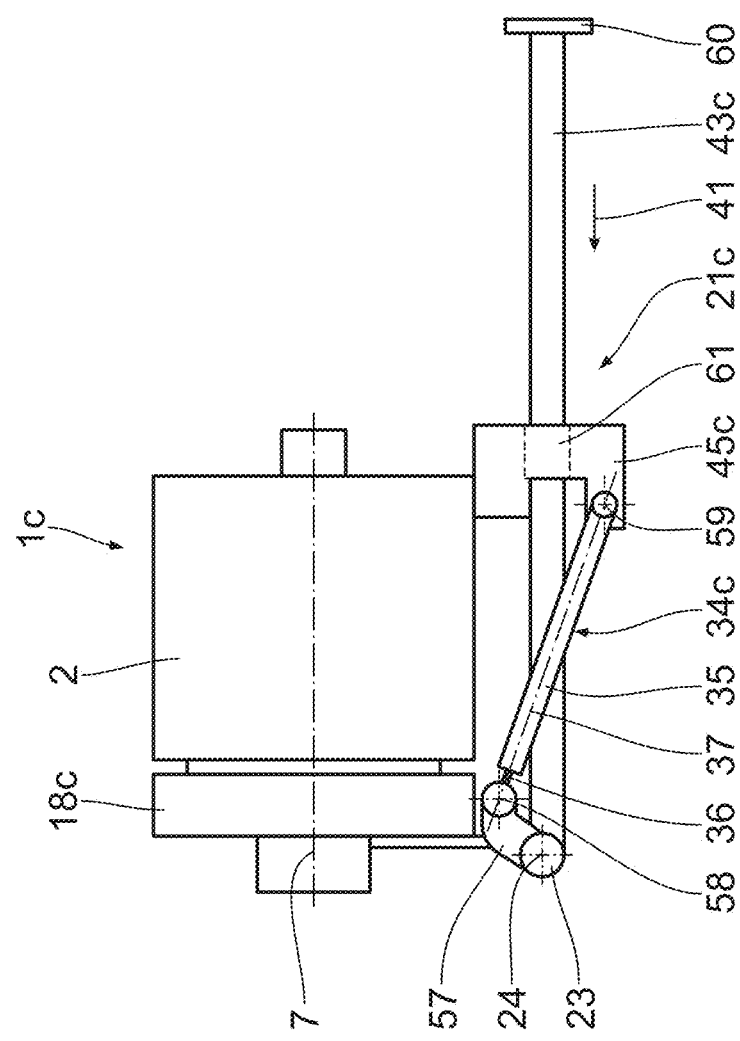
FIG. 16 shows a top view of a cellular wheel sluice corresponding to FIG. 2 according to a fourth exemplary embodiment.
Figure 17:
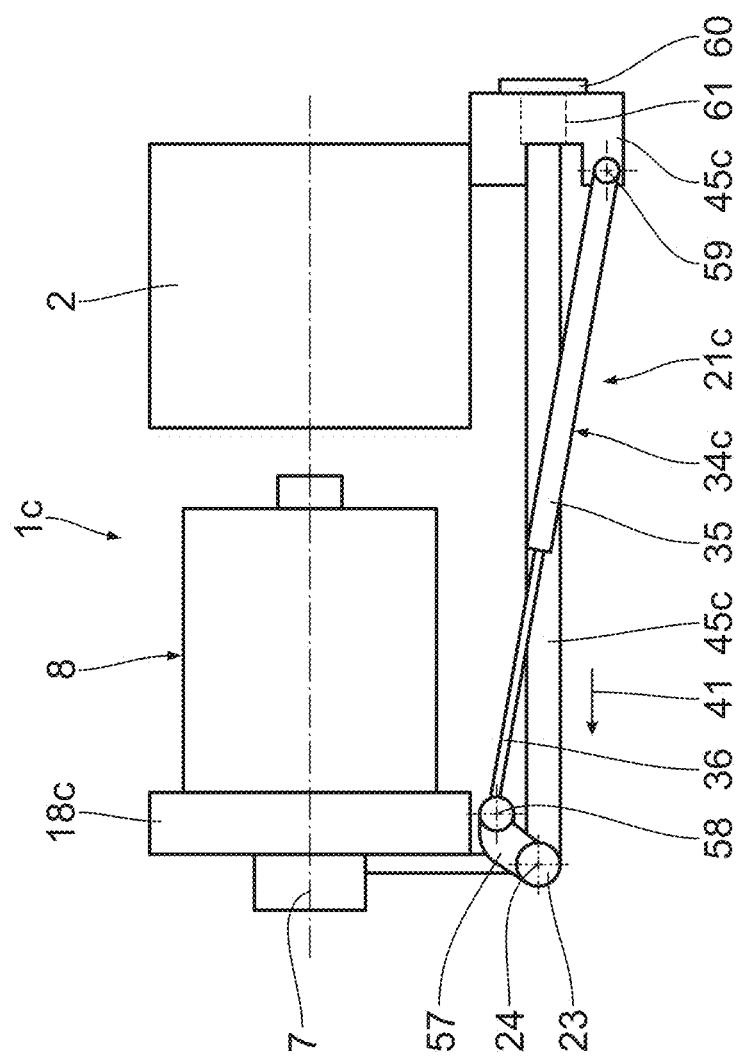
FIG. 17 shows a top view of the cellular wheel sluice in the extracted position corresponding to FIG. 16.
Figure 18:
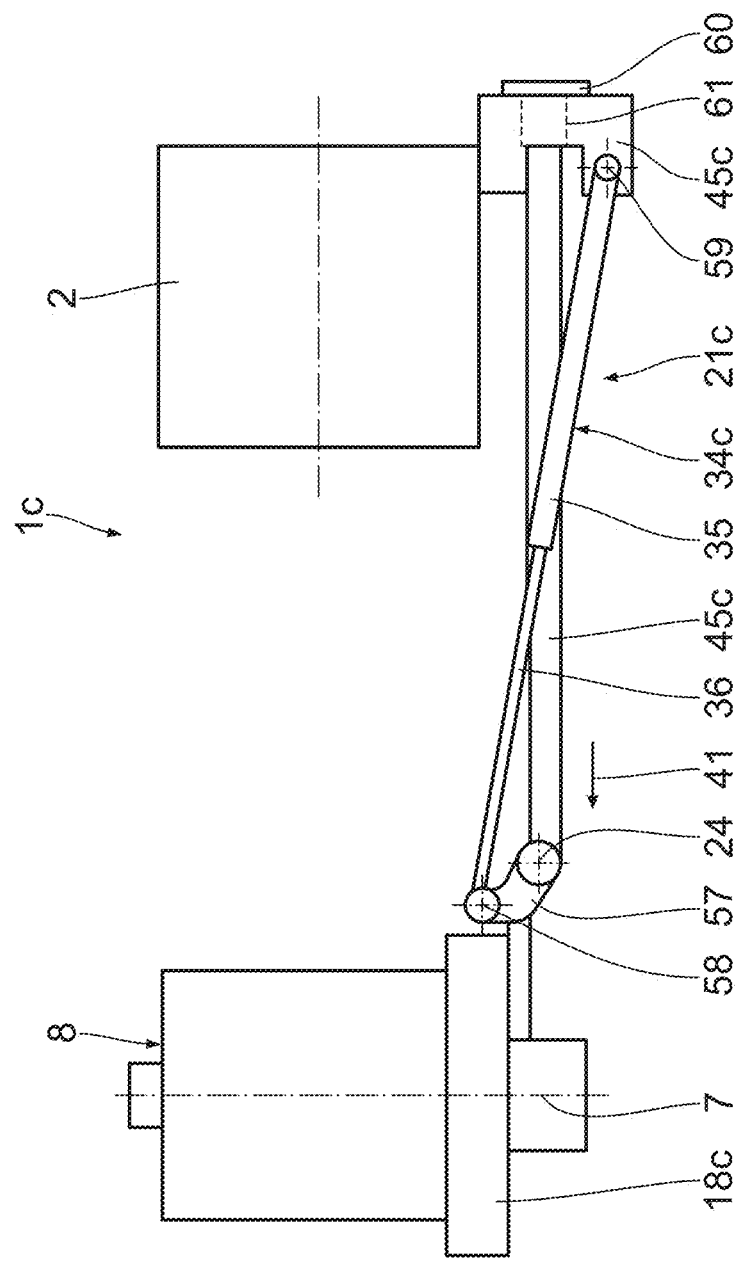
FIG. 18 shows a top view of the cellular wheel sluice in the pivot position corresponding to FIG. 16.

With reference to FIGS. 16 to 18, a fourth exemplary embodiment of the invention is described below. Structurally identical parts are given the same reference signs as in the previous embodiments, to the description of which reference is hereby made. Structurally different but functionally identical parts have the same reference signs followed by a letter "c".

One difference of this cellular wheel sluice 1c is that the extraction drive 34c for pivoting the extraction side cover 18c is mechanically coupled to the side cover pivot axis 24. For this purpose, a pivot lever 57 is articulated with a first end to the first joint 23 for conjoint rotation and eccentrically with respect to the side cover pivot axis 24. At its second end opposite the side cover pivot axis 24, the pivot lever 57 is coupled in an articulated manner to the extraction drive 34c pivotably about a fourth pivot axis 58. In particular, the piston rod 36 is coupled to the pivot lever 57.

At its opposite end, the extraction drive 34c is pivotably articulated to the housing 2 or the guide yoke 45c so that it can pivot about a fifth joint axis 59.

The guide yoke 45c is part of the guide unit 21c. The guide unit 21c has at least one and in particular several guide rods 43c, each of which has a stop element 60 at its end opposite the first joint axis 24. The stop element 60 is designed as a shoulder and has an extension radially to the longitudinal axis of the guide rod 43c that is greater than the outer diameter of the guide rod 43c. This mechanically prevents the guide rod 43c from being displaced beyond the stop element 60 in the extraction direction 41. In particular, the shoulder is integrally molded or integrally welded to the guide rod 43c or is fastened by means of a screw or bolt connection.

In addition or as an alternative to the stop element 60, the guide rods 43c can be axially displaced relative to the housing 2 by means of a fixing element 61. In particular, the fixing element 61 is integrated in the guide yoke 45c, especially in the region where the guide rod 43c passes through. The fixing element enables the guide rod 43c to be fixed in the guide yoke 45c, in particular by force fit, for example by clamping or magnetically, or by form fit, for example by a transverse locking bolt or by a spring pressure piece. The fixing element 61 enables reliable axial locking of the guide rod 43c.

It is essential that the longitudinal drive axis 37, which is the line of action of the extraction force that can be exerted by the extraction drive 34c, does not intersect the side cover pivot axis 24. By means of the eccentric pivot lever 57, a torque can be applied to the side cover pivot axis 24 by the extraction drive 34c, which is designed as a linear drive, in order to pivot the cellular wheel 8.

In particular for the re-introduction of the cellular wheel 8 into the housing 2, it is advantageous if mechanical elements are present which, as a result of the introduction movement of the extraction drive 34c, cause an automatic pivot movement of the extraction side cover 18c with the cellular wheel 8 attached thereto, in particular back into the non-pivoted arrangement. These elements are attached in particular to the guide unit 21c, in particular to the guide rods 41c and/or to other moving parts.

A particular advantage of this exemplary embodiment is that a automatically driven displacement is possible both for extending the cellular wheel 8 and for pivoting the cellular wheel 8 with only a single drive, in particular a linear drive 34c. The number of drive components required is reduced. Such a drive is uncomplicated and requires a lower investment outlay.

A method for clearing the cellular wheel 8 is explained in greater detail below with reference to FIGS. 16 to 18.

Starting from the operational position in FIG. 16, the cellular wheel 8 with the extraction side cover 18 is extracted by actuating the extraction drive 34c. The piston rod 36 is extended from the drive housing 35 and an extraction force is applied to the extraction side cover 18. The force exerted by the extraction drive 34c is transmitted to the extraction side cover 18 and the cellular wheel 8 via the pivot lever 57 and the first joint 23.

As long as the cellular wheel 8 is arranged at least partially within the housing 2, the cellular wheel 8 is forcibly guided. Pivoting of the cellular wheel 8 about the side cover pivot axis 24 is reliably and easily prevented.

Actuation in the extraction direction 41 takes place until the guide rods 43c rest against the guide yoke 45c with the stop element 60 and/or the guide rods 43c are axially locked in the guide yoke 45c by means of the fixing element 61. Further axial displacement of the extraction side cover 18c with the cellular wheel 8 is thus blocked. This extracted position is shown in FIG. 17.

If, starting from the extracted position in FIG. 17, the extraction drive 34c is actuated again, the pivot lever 57 is actuated, i.e. pivoted with respect to the side cover pivot axis 24. According to FIG. 18, this pivot movement takes place counterclockwise about the side cover pivot axis 24. The connecting member 22, which is attached to the extraction side cover 18c, is also pivoted with the pivot lever 57. A maximum pivot position can be specified, for example, by a maximum extension length of the extraction drive 34c. Additionally or alternatively, a stop element, not shown, can be attached to the pivot lever 57 and for example strikes against the guide rod 43c.

The cellular wheel 8 is always introduced into the housing 2 in the reverse order.

When moving the cellular wheel sluice 1c from the pivot position in FIG. 18 to the extracted position in FIG. 17, it can be advantageous if the pivot lever 57 has a further stop element 60 to ensure the concentric position of the cellular wheel 8 with respect to the longitudinal axis 7 in the housing 2.

Figure 19:
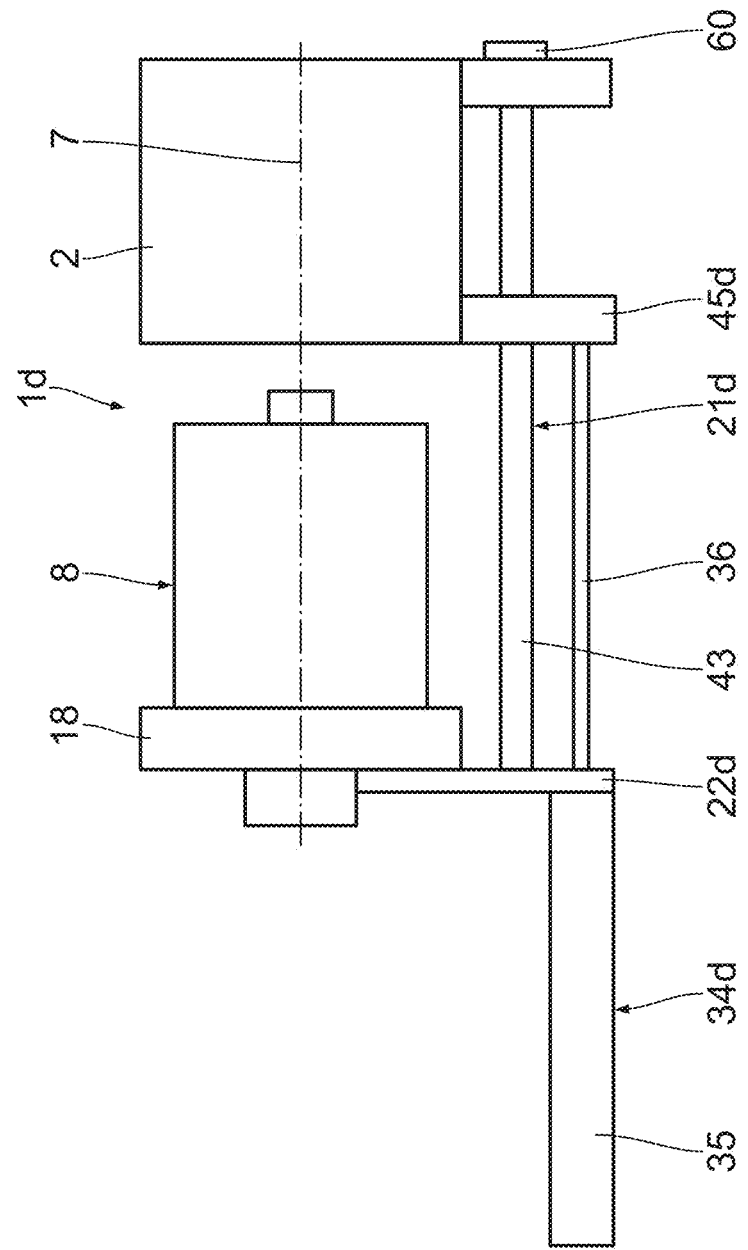
FIG. 19 shows a highly schematized view of a cellular wheel sluice corresponding to FIG. 10 according to a fifth exemplary embodiment, in which the extraction drive is fixed to the extraction side cover.

With reference to FIG. 19, a fifth exemplary embodiment of the invention is described below. Structurally identical parts are given the same reference signs as in the previous exemplary embodiments, to the description of which reference is hereby made. Structurally different but functionally identical parts are given the same reference signs followed by a letter "d".

In contrast to the previous exemplary embodiments, in the cellular wheel sluice 1d the extraction drive 34d is held with the drive housing 35 on the first connecting member 22d, i.e., is attached thereto. The piston rod 36 is axially supported on the housing 2 and/or on the guide unit 21d, in particular on a guide yoke 45d.

According to the exemplary embodiment shown, the guide rods 43 have a stop element 60 at the end, which can be omitted if the length of the guide rods 43 is selected to be sufficiently long so that linear guidance is reliably ensured even with maximum stroke movement of the extraction drive 34d.

For illustration reasons, the inlet shaft, the outlet shaft and the drive side cover with the cellular wheel drive attached to it are not shown on the housing 2 in FIG. 19.

As in the previous exemplary embodiments, the extraction side cover 18 can be designed to pivot about a pivot axis. In this regard, reference is made to the previous exemplary embodiments.

The extraction drive 34d is in particular a piston-cylinder unit, in particular in the form of a pneumatic cylinder or a hydraulic cylinder. The guide unit 21d is a linear guide.

The invention claimed is:

1. A cellular wheel sluice for bulk material comprising a. a housing with an interior,
b. an extraction side cover detachably attached to the housing,
c. a cellular wheel which is arranged in an operational position in the housing so that it can be driven in rotation about a longitudinal axis and which is held on the extraction side cover,
d. an extraction device for displacing the cellular wheel between the operational position, in which the housing is closed and locked by the at least one extraction side cover, and an extracted position, in which the extraction side cover is unlocked and removed from the housing, wherein the extraction device comprises
  i. a guide unit for guided displacement of the cellular wheel along an extraction direction parallel to the longitudinal axis,
  ii. an extraction drive coupled to the extraction side cover for automatically driven displacement of the extraction side cover with the cellular wheel,
wherein:
e. the extraction drive is arranged fixed to the housing, and
f. the cellular wheel sluice has a control unit, which is designed such that the cellular wheel is automatically displaceable between the operational position and the extracted position.

2. The cellular wheel sluice as claimed in claim 1, wherein the extraction side cover is arranged pivotably about a side cover pivot axis in the extracted position.

3. The cellular wheel sluice as claimed in claim 2, wherein the extraction drive for pivoting the extraction side cover is mechanically coupled to the side cover pivot axis.

4. The cellular wheel sluice as claimed in claim 2, wherein a side cover pivot drive is provided for automatically pivoting the extraction side cover.

5. The cellular wheel sluice as claimed in claim 1, wherein the guide unit is designed as a linear guide.

6. The cellular wheel sluice as claimed in claim 1, wherein the extraction drive is designed as a linear drive.

7. The cellular wheel sluice as claimed in claim 1, wherein the extraction drive and the guide unit are designed as integral component.

8. The cellular wheel sluice as claimed in claim 1, wherein the extraction side cover is detachably fastened to the housing by at least one fastening element, wherein the at least one fastening element can be detached manually and/or automatically.

9. The cellular wheel sluice as claimed in claim 1, wherein the extraction side cover can be automatically locked to the housing by means of a rotary lock.

10. The cellular wheel sluice as claimed in claim 1, comprising a cellular wheel drive for mechanically rotating the cellular wheel, which cellular wheel drive is attached to the housing.

11. The cellular wheel sluice as claimed in claim 10, wherein the cellular wheel drive is fastened to the extraction side cover or to an oppositely arranged drive side cover, wherein the drive side cover is detachably fastened to the housing.

12. The cellular wheel sluice as claimed in claim 11, wherein the drive side cover is arranged pivotably about a drive pivot axis with respect to the housing and/or a second extraction device is provided, which has a second guide unit for guided displacement of the drive side cover along an extraction direction parallel to the longitudinal axis and/or a second extraction drive arranged fixed to the housing and coupled to the drive side cover for driven displacement of the drive side cover.

13. The cellular wheel sluice as claimed in claim 1, wherein the cellular wheel is conical with respect to the longitudinal axis.

14. The cellular wheel sluice as claimed in claim 1, comprising a safety device for operating the cellular wheel sluice in a safe mode.

* * * * *